United States Patent [19]

Ikeda et al.

[11] Patent Number: 5,339,381
[45] Date of Patent: Aug. 16, 1994

[54] OPTICAL FIBER COMPOSITE INSULATORS

[75] Inventors: Mitsuji Ikeda; Ryoichi Mine, both of Nagoya; Masayuki Nozaki, Ama; Tadashi Sugiura, Okazaki, all of Japan

[73] Assignee: NGK Insulators, Ltd., Japan

[21] Appl. No.: 33,751

[22] Filed: Mar. 18, 1993

[30] Foreign Application Priority Data

| Mar. 23, 1992 | [JP] | Japan | 4-064765 |
| Mar. 23, 1992 | [JP] | Japan | 4-065276 |
| Mar. 24, 1992 | [JP] | Japan | 4-065784 |
| Mar. 24, 1992 | [JP] | Japan | 4-065787 |
| Mar. 24, 1992 | [JP] | Japan | 4-066017 |

[51] Int. Cl.$^5$ .............................. G02B 6/36
[52] U.S. Cl. ...................... 385/138; 174/139; 174/151; 385/100; 385/134; 385/147
[58] Field of Search ........ 385/100, 101, 123, 134–139, 385/147; 174/138 R, 139, 151, 152 R

[56] References Cited

U.S. PATENT DOCUMENTS

| 4,756,596 | 7/1988 | Ona et al. | 385/110 |
| 4,921,322 | 5/1990 | Seike et al. | 385/138 |
| 5,029,969 | 7/1991 | Seike et al. | 350/96 |
| 5,069,525 | 12/1991 | Seike et al. | 385/100 |
| 5,090,793 | 2/1992 | Seike et al. | 385/100 |
| 5,109,466 | 4/1992 | Seike et al. | 385/137 |
| 5,127,083 | 6/1992 | Ikeda et al. | 385/138 |
| 5,136,680 | 8/1992 | Seike et al. | 385/139 |
| 5,138,692 | 8/1992 | Ikeda et al. | 385/138 |

FOREIGN PATENT DOCUMENTS

| 0297728 | 1/1989 | European Pat. Off. | G02B 6/44 |
| 0364288 | 4/1990 | European Pat. Off. | H01B 17/00 |
| 60-158402 | 10/1985 | Japan . | |

OTHER PUBLICATIONS

Patent Abstracts of Japan, unexamined applications, P field, vol. 9, No. 334, Dec. 27, 1984 The Patent Office Japanese Government p. 124 P 417 * No. 59–12 973 & JP-A-60-158 402 (Fujikura Densen K.K.), Aug. 19, 1985.

*Primary Examiner*—Frank Gonzalez
*Attorney, Agent, or Firm*—Parkhurst, Wendel & Rossi

[57] ABSTRACT

An optical fiber composite insulator includes an insulator body in which a through hole having a substantially radially circular cross section is provided, a plurality of optical fibers passed through the through hole, and an organic insulating material gas-tightly sealing the optical fibers in the through hole, wherein a diameter of the through hole is not more than 13 mm, the optical fibers are located inside a hypothetical circle drawn on any plane orthogonal to an axis of the through hole and having a center coaxial with that of the through hole, the hypothetical circle having a diameter equal to 95% of that of the through hole, and a distance between any optical fibers is set at not less than 0.1 mm.

10 Claims, 24 Drawing Sheets

FIG_1
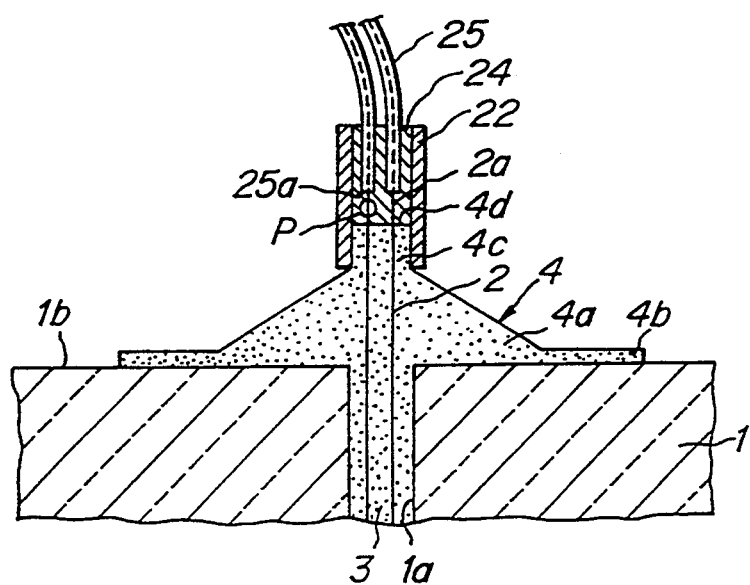

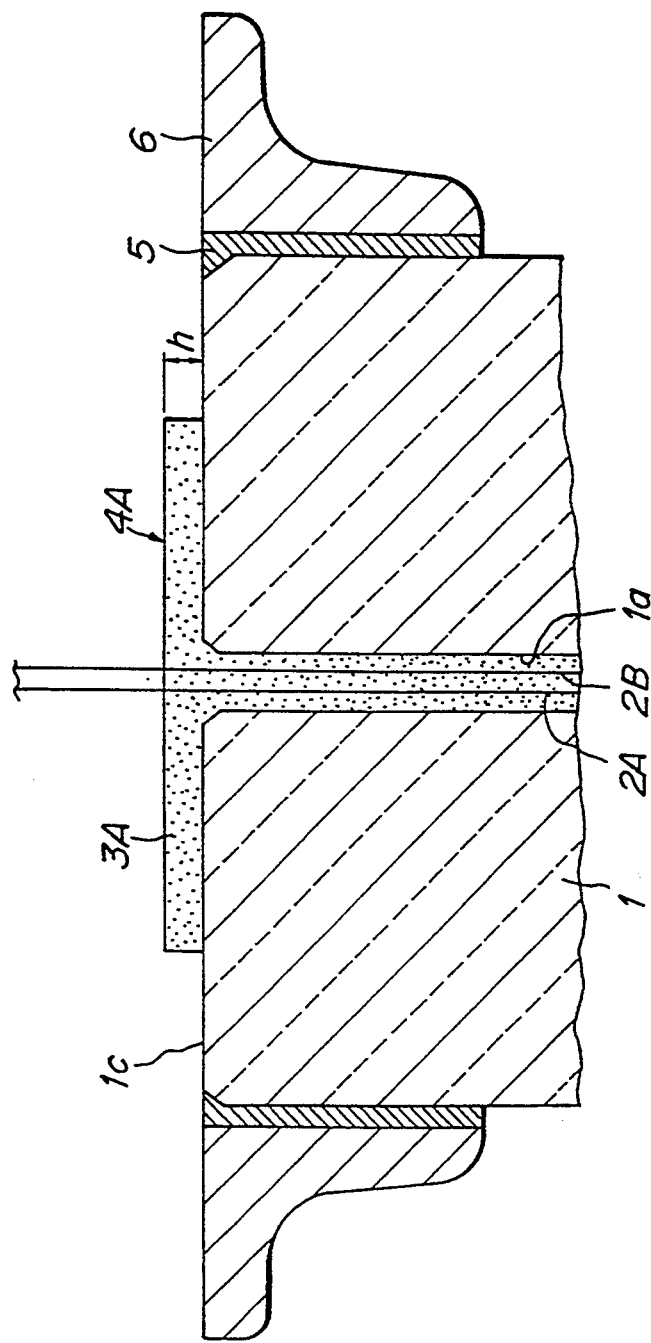

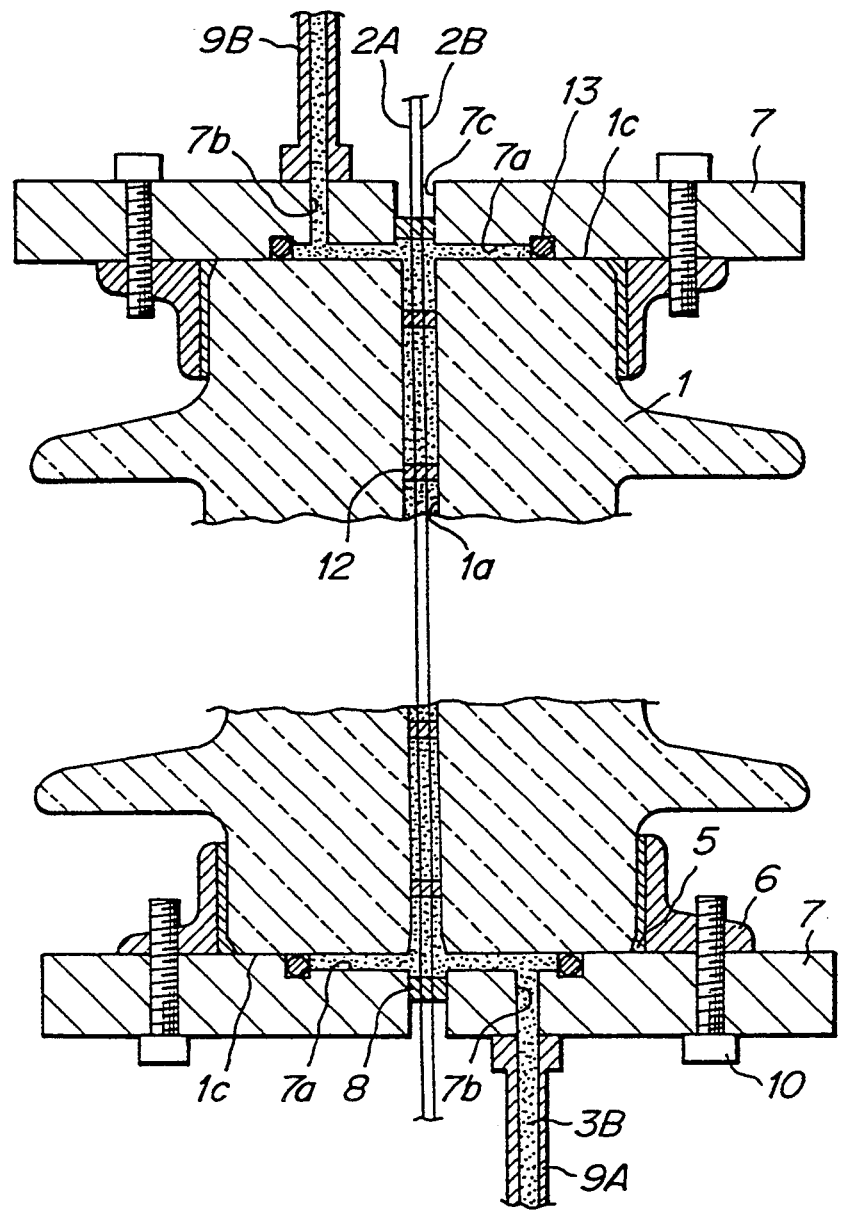

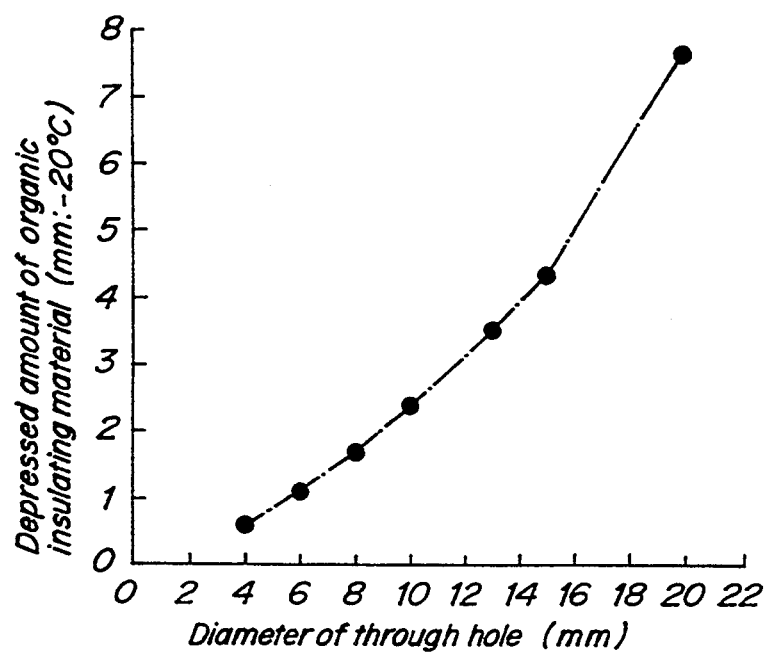
FIG_5

FIG_8

FIG_10

FIG_11

FIG. 13
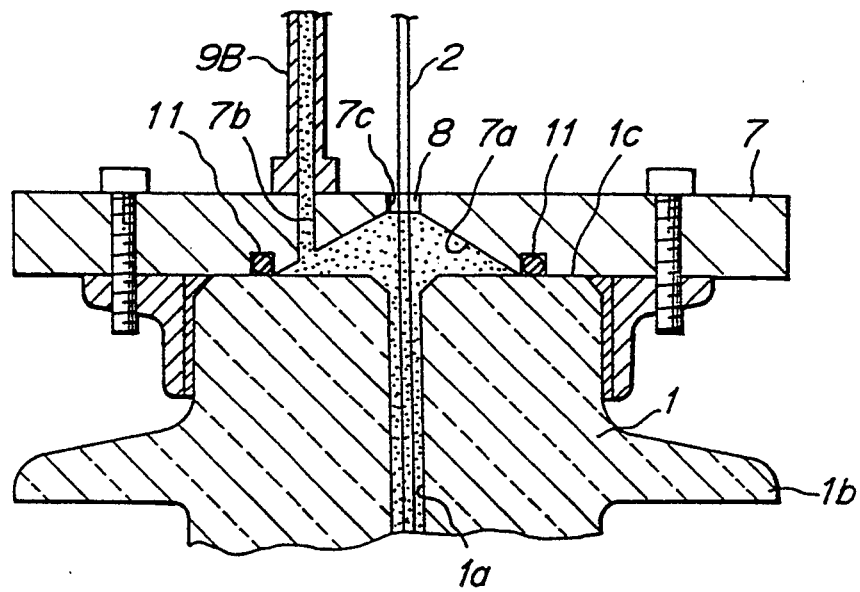
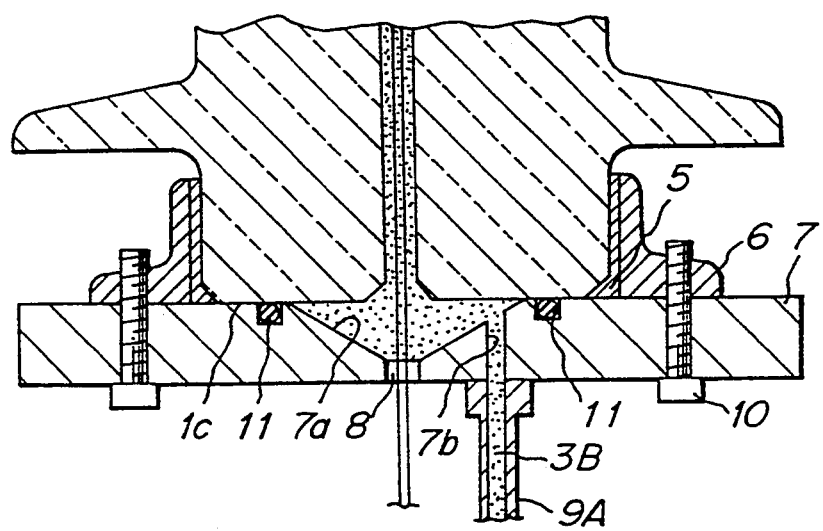

FIG_14

FIG_15

FIG_16

FIG_20

FIG_21

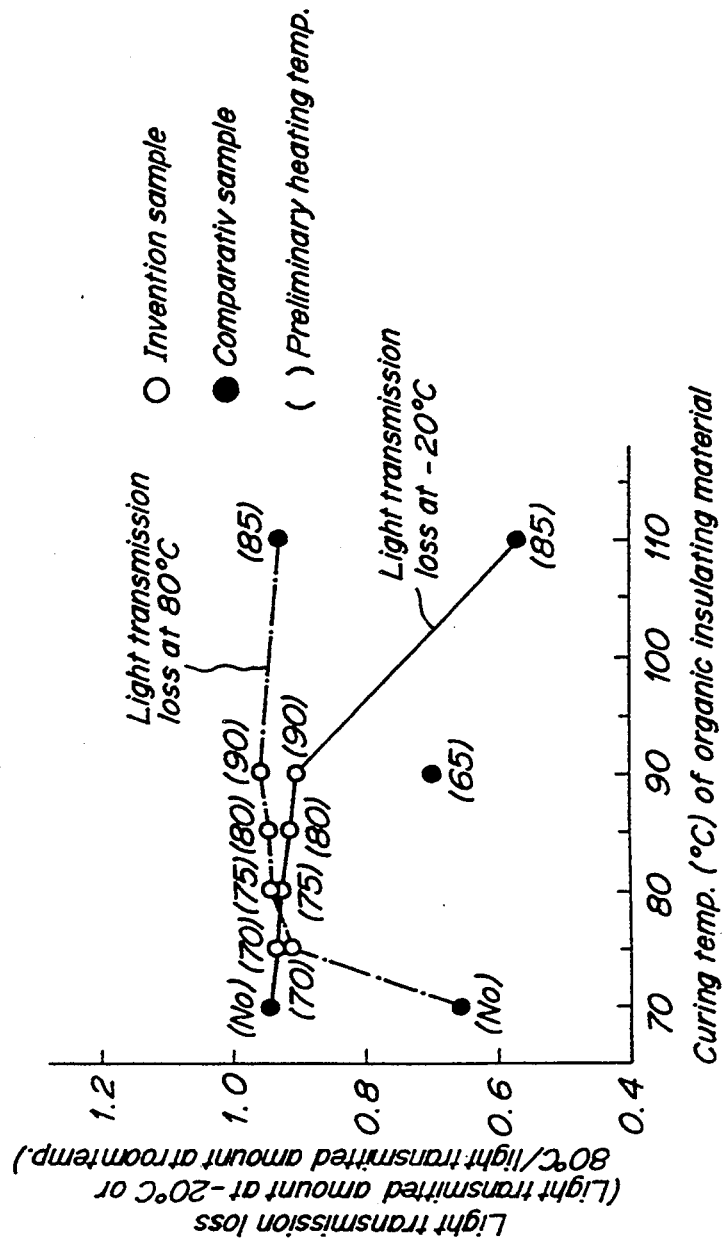

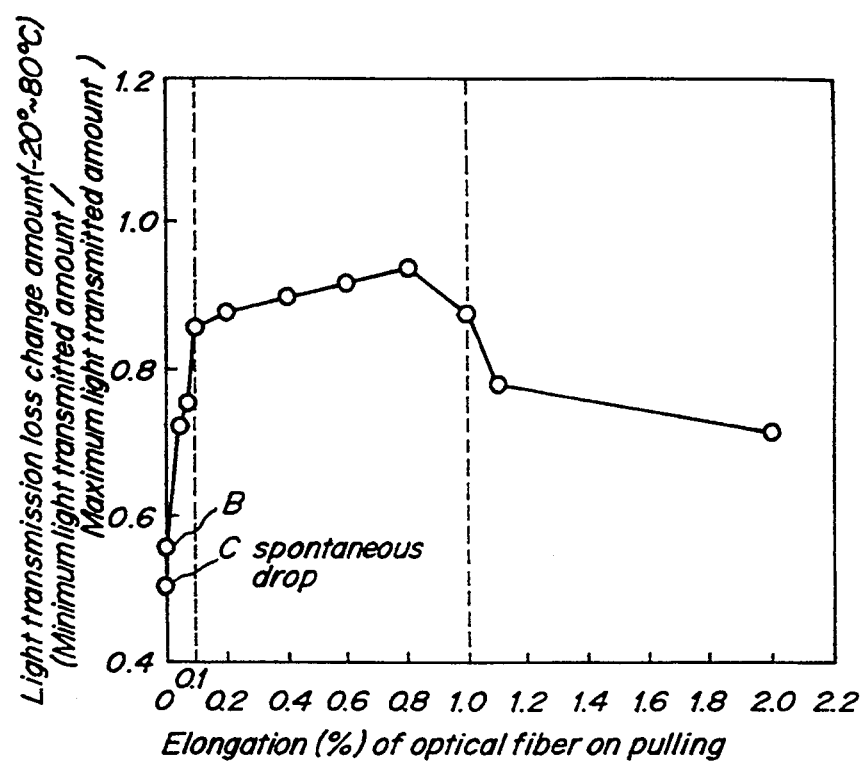
FIG_24

OPTICAL FIBER COMPOSITE INSULATORS

BACKGROUND OF THE INVENTION (1) Field of the Invention

The present invention relates to optical fiber composite insulators and processes for producing the same.

(2) Related Art Statement a) Power transmission lines and power substations require systems for rapidly detecting locations of any troubles occurring in the power transmission lines or the power substations due to lighting, etc. and for restoring the systems. Therefore, abnormal current or abnormal voltage detectors utilizing optical sensors having Faraday effects and Pockels effect have been used. In these detectors, it is necessary to insulate the voltage and current in the power transmission between the sensor attached to a power transmission line and the troubled location detector. For this purpose, optical fiber composite insulators in which optical fibers are placed are used to transmit optical signals only and maintain electrical insulation.

As such optical fiber composite insulators, it is a common practice that a slender through hole is provided in the insulator body thereof, an optical fiber is passed through this through hole, and the optical fiber is sealed in the through hole with an organic insulating material such as silicone rubber or an epoxy resin. However, there is a problem in that the organic insulating material is largely shrunk at low temperatures in the winter season so that the optical fiber is warped to increase loss in the light transmission. Further, there is another problem in that the organic insulating material does not go around the optical fiber if organic insulating material-pouring conditions are not properly kept during the production of the optical fiber composite insulator so that poorly adhered locations are likely to be formed to reduce insulating performance.

b) Moveover, Japanese Utility Model Registration Laid-open No. 64-31,620 proposed an optical fiber composite insulator in which a through hole is provided in a slender insulator body, an optical fiber is passed through the through hole, and an organic insulating material is filled in this through hole in the state that the organic insulating material is swelled up from end faces 2 of the insulator body. This is to absorb expansion of the organic insulating material with the swelled portions of the organic insulating material so that swelling of the interior organic insulating material itself out of the through hole and consequent breakage of the optical fiber may be prevented. Since the expanded amount of the organic insulating material is great at high temperatures, it is a common practice that the organic insulating material is largely swelled up to absorb the expansion as much as possible.

However, such optical fiber composite insulators also have a problem in that the light transmission loss increases particularly at low temperatures. Furthermore, the insulators have another problem in that adhesion forces decrease between the swelled-up portion made of the organic insulating material and the end face of the insulator body, when the insulator undergoes temperature changes over an extended time period.

c) Furthermore, NGK proposed an optical fiber-holding structure as an optical fiber composite insulator in Japanese Utility Model Registration Application No. 3-87,080 (filed on Sept. 27, 1992, not published) schematically shown in FIG. 1. This structure will be briefly explained.

A through hole $1a$ is provided in a central portion of an insulator body 1, and for example, two optical fibers 2 are passed through the through hole $1a$. Optical fibers 2 are gas-tighly sealed inside the through hole $1a$ with an organic insulating material 3. In the embodiment of FIG. 1, the organic insulating material 3 is swelled up from an end face $1b$ of the insulator body 1 to form a swelled portion 4. This swelled portion 4 consists of three portions. That is, a frusto-conical portion $4a$ is concentrically formed around the through hole $1a$, a columnar top portion $4c$ is formed on a central portion of the frusto-conical portion $4a$, and a relatively thin extended portion $4b$ is formed at a skirt of an outer peripheral edge of the frusto-conical portion $4a$. The optical fibers 2 are passed through the frusto-conical portion $4a$ and the columnar top portion $4c$, and comes out from an end face $4d$ of the columnar top portion $4c$.

A peripheral side face of the columnar top portion $4c$ is covered with a cylindrical pipe 22. Portions of the optical fibers 2 not sealed with the organic insulating material are passed through protective tubes 25. Parts of the optical fibers are exposed between end faces of the protective tubes $25a$ and the end face $4d$ of the columnar top portion $4c$. A molding adhesive is poured and filled into the pipe 14, thereby forming a molding layer 24. The exposed portions $2a$ of the optical fibers and the near end faces of the protective tubes 7 are fixed and held inside the molding layer 24.

However, it is first discovered that such a holding structure has the following problems.

That is, since the optical fibers 2 and the tip portions of the protective tubes 25 are directly fixed inside the molding layer 24, it may be that the optical fibers 2 are fixed in a bent shape at the exposed portions $2a$ thereof (particularly, at a portion P shown) when the molding adhesive is poured between the end face of the columnar top portion $4c$ and the tip portions of the protective tubes 25, so that excess load is applied to the optical fiber 2 in some cases. Further, since the protective tubes may not be sufficiently fixed, excess load is exerted upon the optical fibers particularly at the portion P when the protective tubes are bent or sway.

d) In the optical fiber composite insulators, one or more optical fibers are passed through the through hole provided in the insulator body, the organic insulating material is filled in the through hole, and the organic insulating material is cured by heating. As is known, the curing temperatures of the organic insulating materials range from room temperature to beyond 100° C. For example, Japanese Patent Application Laid-open No. 2-106,823 discloses that the curing temperature is set at not less than 60° C. when the organic insulating materials is silicone rubber. Further, in order to cure the organic insulating material by heating, it is known that after the organic insulating material is filled into the insulator body at room temperature, the organic insulating material is cured by heating the entire insulator.

The organic insulating material filled in the through hole of the insulator expands or shrinks with changes in the surrounding temperature. At that time, the organic insulating material expands following the expansion on a temperature side higher than the curing temperature of the organic insulating material so that the optical fiber undergoes compression in a radial direction of the insulator. Therefore, when the insulator is heated to high temperatures through direct irradiation of sunlight in the summer or passage of current, the optical fiber is finely warped (microbending) due to expansion of the organic insulating material when the curing temperature is too low. Consequently, the light transmission loss increases. To the contrary, when the insulator is cooled to low temperatures with cold wind in the winter season or other reason and the curing temperature of organic insulating material is too high, the organic insulating material is shrunk to cause the optical fiber to be finely warped (microbending), so that the light transmission loss becomes greater, too.

Furthermore, when the entire insulator is heated after the organic insulating material is filled into the insulator body at room temperature, it takes a long time to heat the insulator to a given temperature because the heat capacity of the insulator is large. Consequently, the organic insulating material is cured at a temperature lower than the intended curing temperature, so that the light transmission loss becomes greater when the insulator is heated to high temperatures.

Furthermore, the optical fiber is finely bent (microbending) with a pressure exerted upon the fiber on filling the fluidizing organic insulating material by the shrinkage of the organic insulating material on curing, so that the sealing is effected in some cases in the state that the optical fiber is kept bent. If the optical fiber is sealed in the bent state, stress concentrates upon a bent portion of the optical fiber. As a result, the light transmission loss of the optical fiber increases, fatigue fracture is likely to occur due to expansion and shrinkage of the organic insulating material with changes in the surrounding temperature, and service life of the optical fiber decreases.

SUMMARY OF THE INVENTION

The present invention solves the above-mentioned problem in (a), and is aimed at improving the light transmission performance at low temperatures and insulating performance of the optical fiber composite insulator.

A first aspect of the present invention relates to an optical fiber composite insulator in which a through hole having a substantially circular cross sectional shape as viewed in a diametrical direction is provided in an insulator body, a plurality of optical fibers are passed through the through hole, and the optical fibers are gas-tightly sealed with an organic insulating material, wherein the diameter of the through hole is not more than 13 mm, the optical fibers are located inside a hypothetical circle having a coaxis with the through hole and a diameter being 95% of that of the through hole, and a distance between the optical fibers is not less than 0.1 mm.

A second aspect of present invention solves the above-mentioned problems in (b), and is aimed at reducing the light transmission loss of the optical fiber composite insulator of the type in which the optical fibers are sealed with the organic insulating material. Further, the invention is also aimed at separation between a swelled portion of the organic insulating material and an end face of the insulator body at an bonding interface. Furthermore, such an optical fiber composite insulator is produced at a high efficiency without exerting adverse effects upon the light transmission performance of the optical fiber.

According to the second aspect of the present invention which is to improve the optical fiber composite insulator of the first aspect of the invention, the organic insulating material is swelled up outwardly from the end face of the insulator body to form a swelled portion, and the height of the swelled portion of the insulating material from the end face of the insulator body to the tip of the swelled portion is set at not more than 40 mm.

Further, the second aspect of the present invention improves on the optical fiber composite insulator of the first aspect of the present invention, and is directed to the optical fiber composite insulator in which the organic insulating material is swelled up outwardly from the end face of the insulator body to form a swelled up outward portion, and a bonded length from an outer peripheral edge of the through hole at the end face of the insulator body to the outer peripheral edge of the bonded portion of the swelled portion to the end face of the insulator body is set at not less than 1 mm and not more than 35 mm.

A third aspect of the present invention solves the above-mentioned problems in (c), and is aimed at preventing application of an excess load upon the optical fibers taken out near the end face of the organic insulating material and to reduce resulting light transmission loss.

The third aspect of the present invention improves on the optical fiber composite insulator of the first aspect of the present invention, and relates to the optical fiber composite insulator in which portions of the optical fibers projecting outwardly from the insulator body and not covered with the organic insulating material are passed through respective protective tubes, the optical fibers are exposed between one end face of the protective tubes and an end face of the organic insulating material, a holder having insertion holes is fixed to the end face of the organic insulating material, optical fiber-taken out locations are aligned with the respective insertion holes of the holder, and the exposed portions of the optical fibers and the protective tubes are partially held inside the insertion holes.

A fourth aspect of the present invention solves the above-mentioned problems in (d), provides a process for producing optical fiber composite insulators, which can prevent the microbending of the optical fibers and realize excellent light transmission performance and durability.

The fourth aspect of present invention provides a process for producing optical fiber composite insulators in which a through hole is provided in an insulator body, at least one optical fiber is passed through the through hole, and at least one optical fiber is sealed with an organic insulating material, wherein after the entire insulator body is preliminarily heated to not less than 70° C., the organic insulating material is filled into the through hole of the insulator body in the state that the optical fiber passed through the through hole is stretched straight, and the filled organic insulating material is cured at not less than 75° C. to not more than 95° C. by heating in the state that the at least one optical fiber is kept stretched straight until the organic insulating material is cured.

In the above construction, when the organic insulating material is heated at not less than 75° C. to not more than 95° C., the light transmission loss due to expansion of the organic insulating material at high temperatures and due to shrinkage of the organic insulating material at low temperatures can be prevented. Thus, the optical fiber composite insulator having excellent light transmittability over a range of the temperatures changeable in use environment of the insulator can be obtained. Further, after the entire insulator body is preliminarily heated up to not less than 70° C., the organic insulating material is filled in the through hole of the insulator body and the organic insulating material is cured by heating. Consequently, the organic insulating material is assuredly cured in a temperature range of not less than 75° C. but not more than 90° C. by heating, so that the optical fiber composite insulator having excellent light transmittability can be obtained. As will be clear from examples given later, the reason why the curing temperature of the organic insulating material is limited to not less than 75° C. but not more than 90° C. and the reason why the preliminarily heating temperature is limited to not less than 70° C. are to suppress light transmission loss which cannot be attained at temperatures outside these ranges.

These and other objects, features and advantages of the invention will be understood from the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a sectional view of a principle portion of an optical fiber composite insulator as a reference example;

FIG. 2 is a sectional enlarged view of an optical fiber composite insulator according to the first aspect of the present invention near an end face thereof;

FIG. 3b is a similar sectional view of a modification of the optical fiber composite insulator in FIGS. 2 and 3a;

Figure 6:
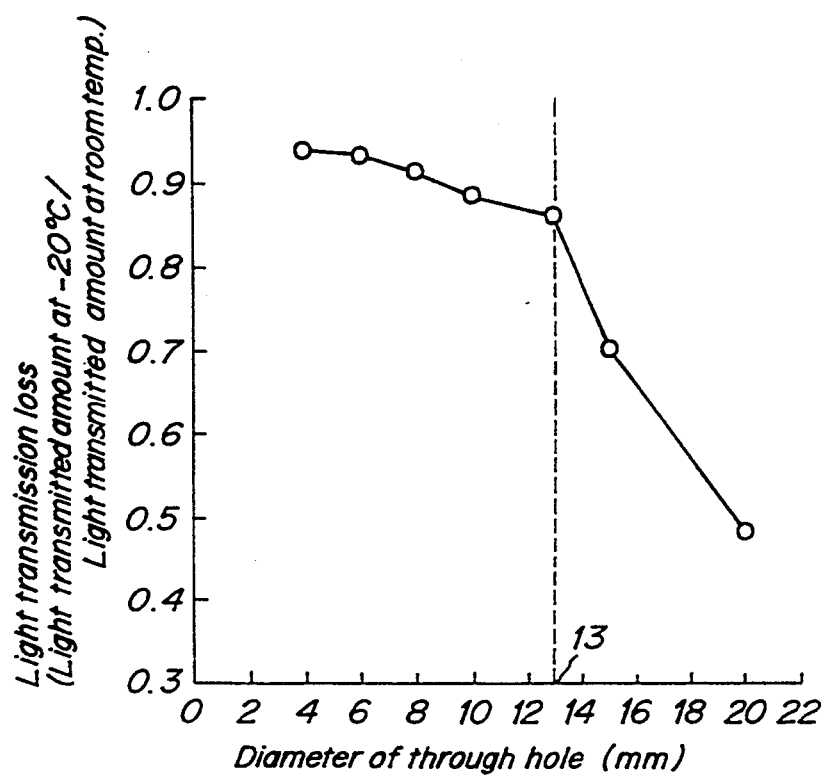
Figure 7:
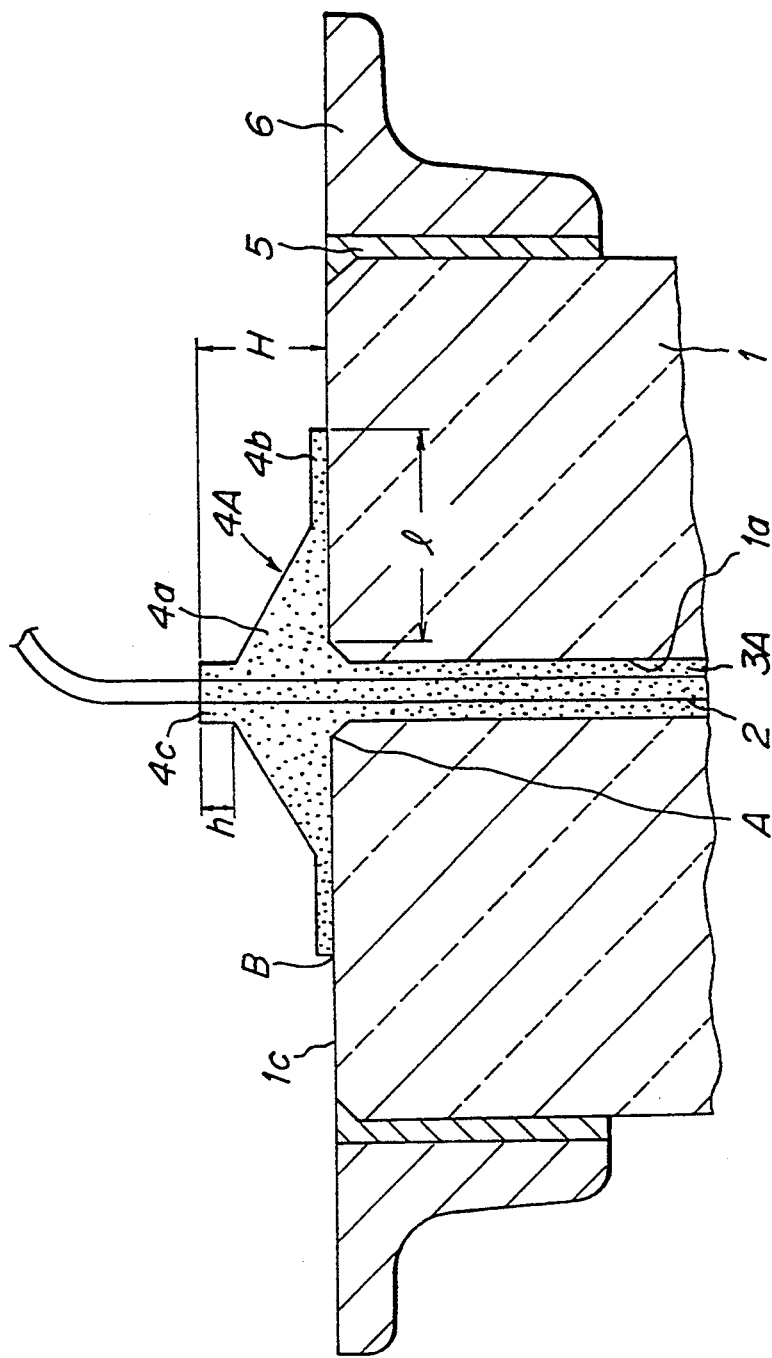
Figure 8:
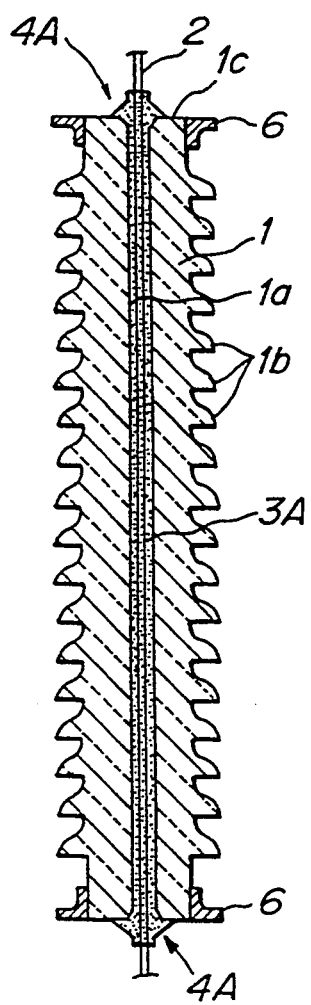
Figure 9:
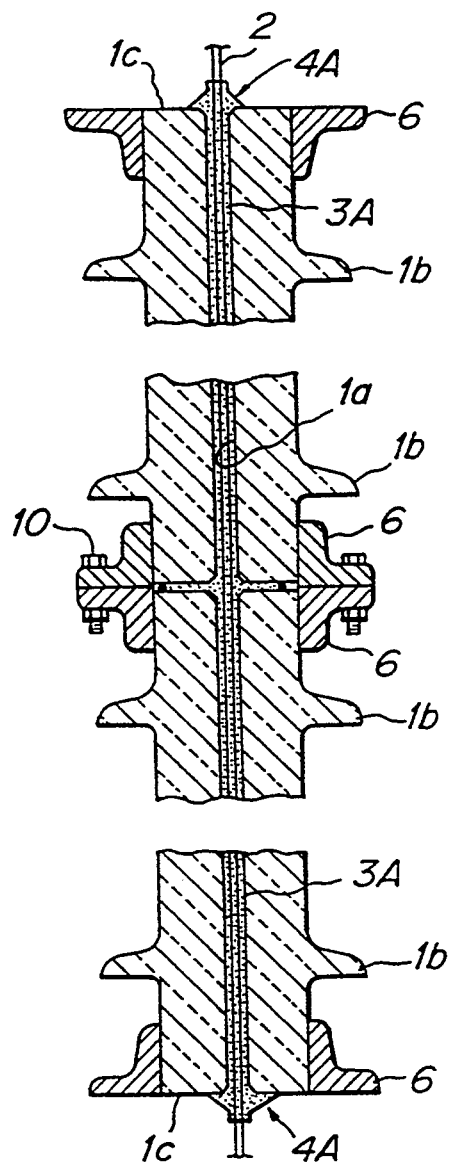
Figure 10:
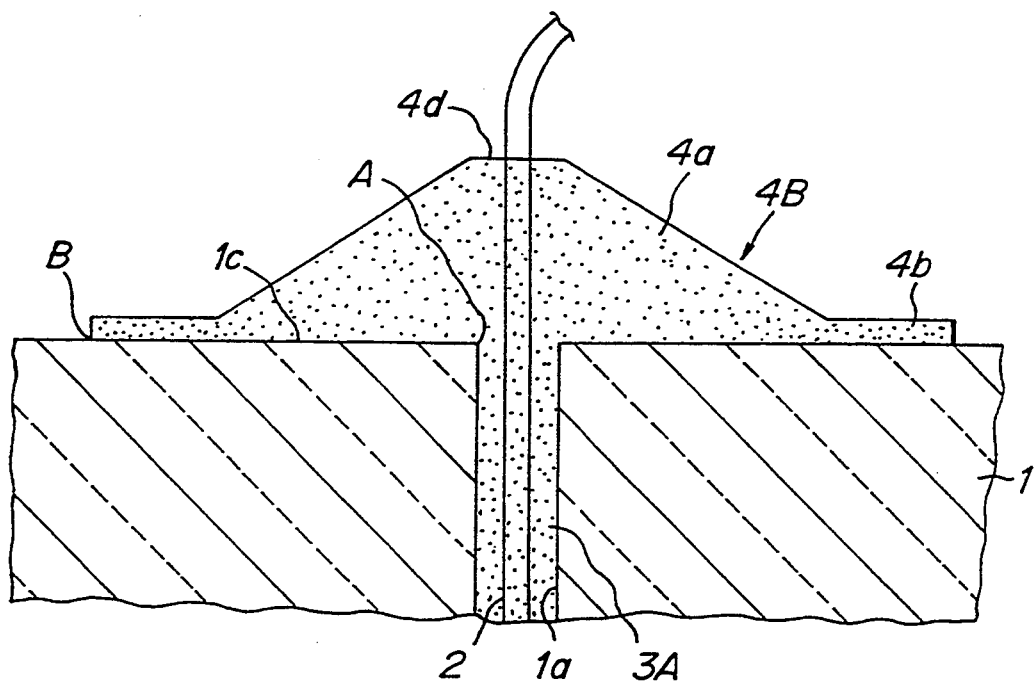
Figure 11:
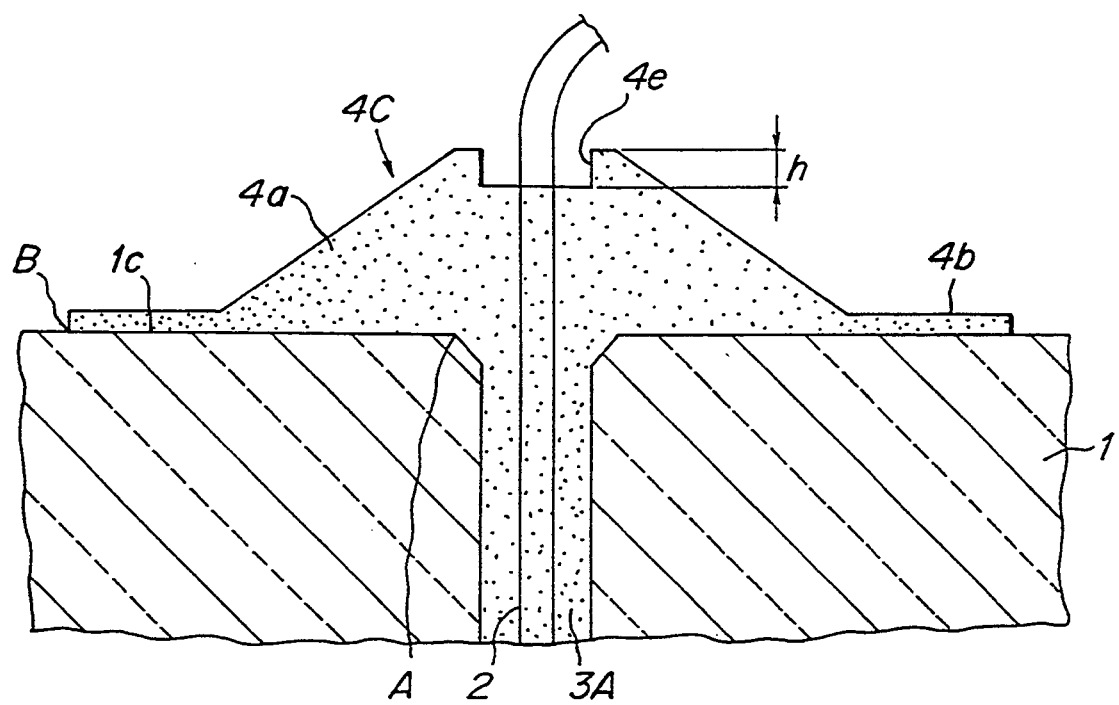
Figure 12:
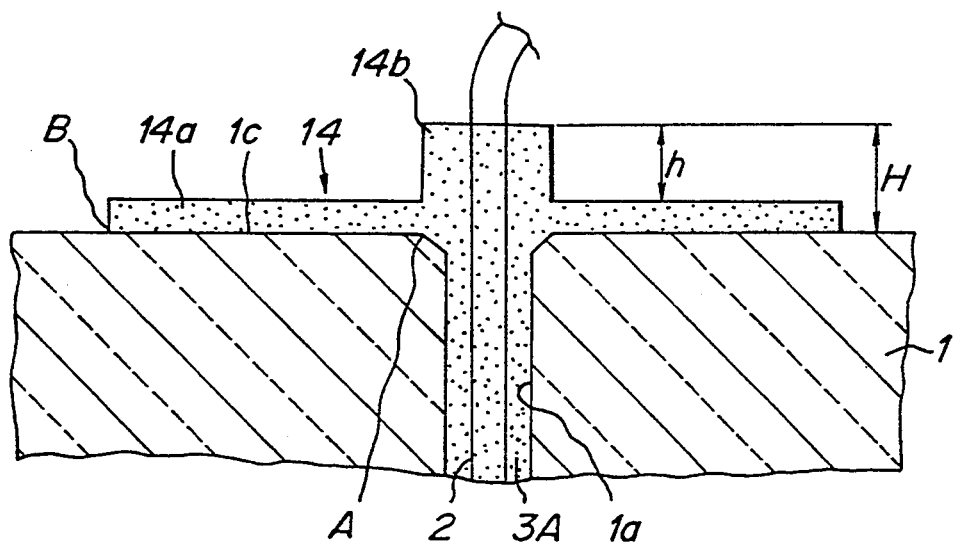
Figure 14:
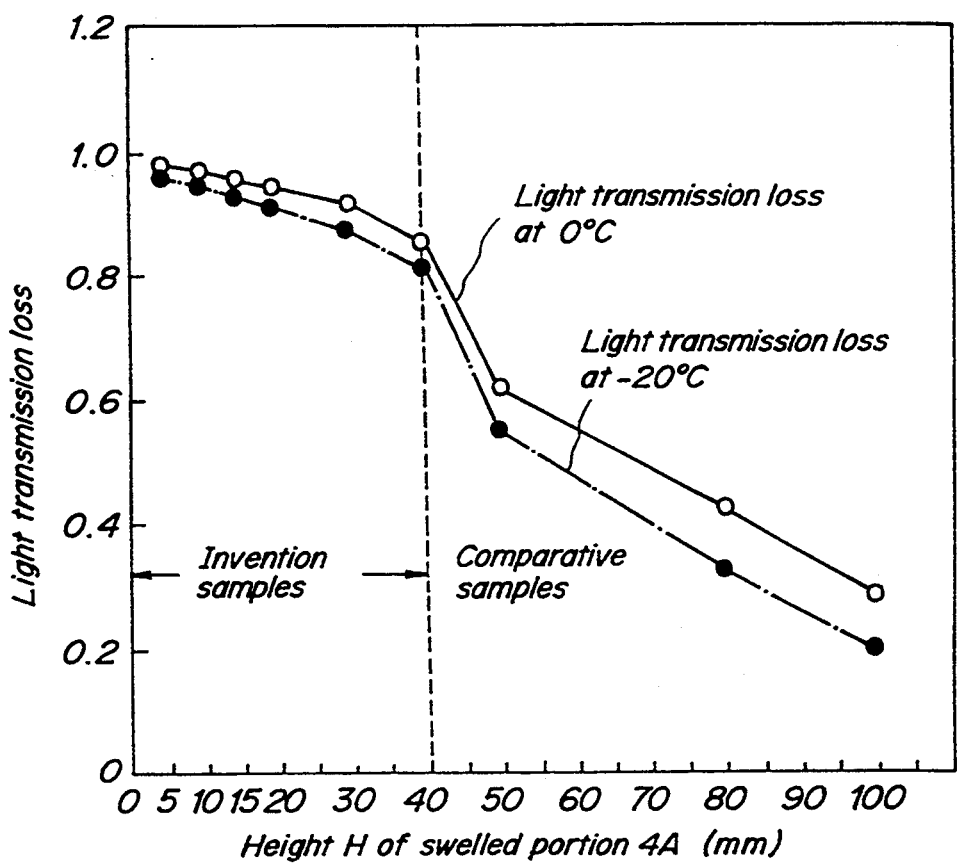
Figure 15:
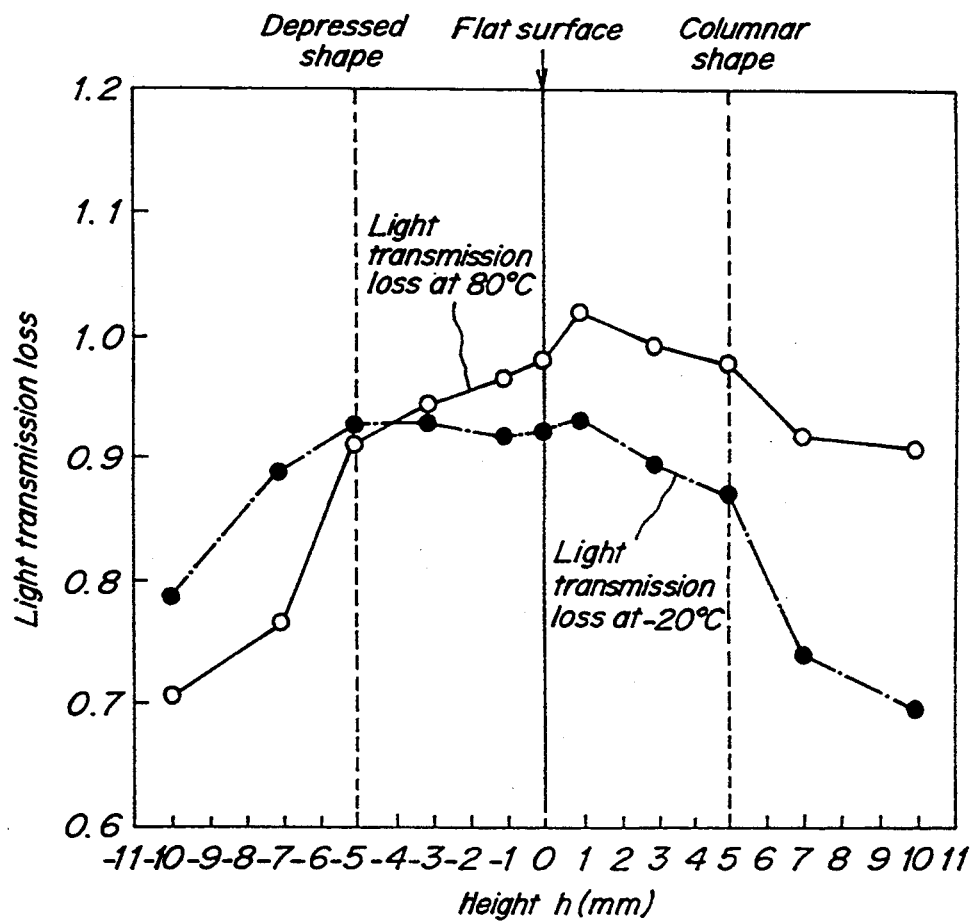
Figure 16:
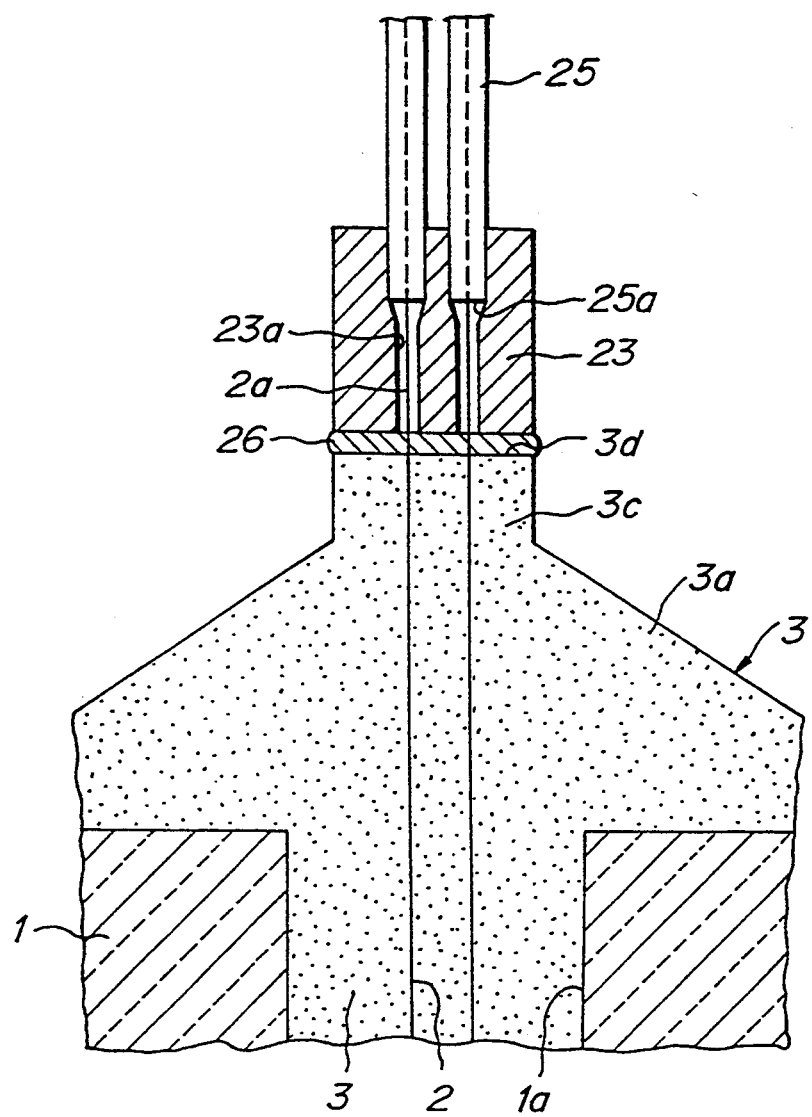
Figure 17:
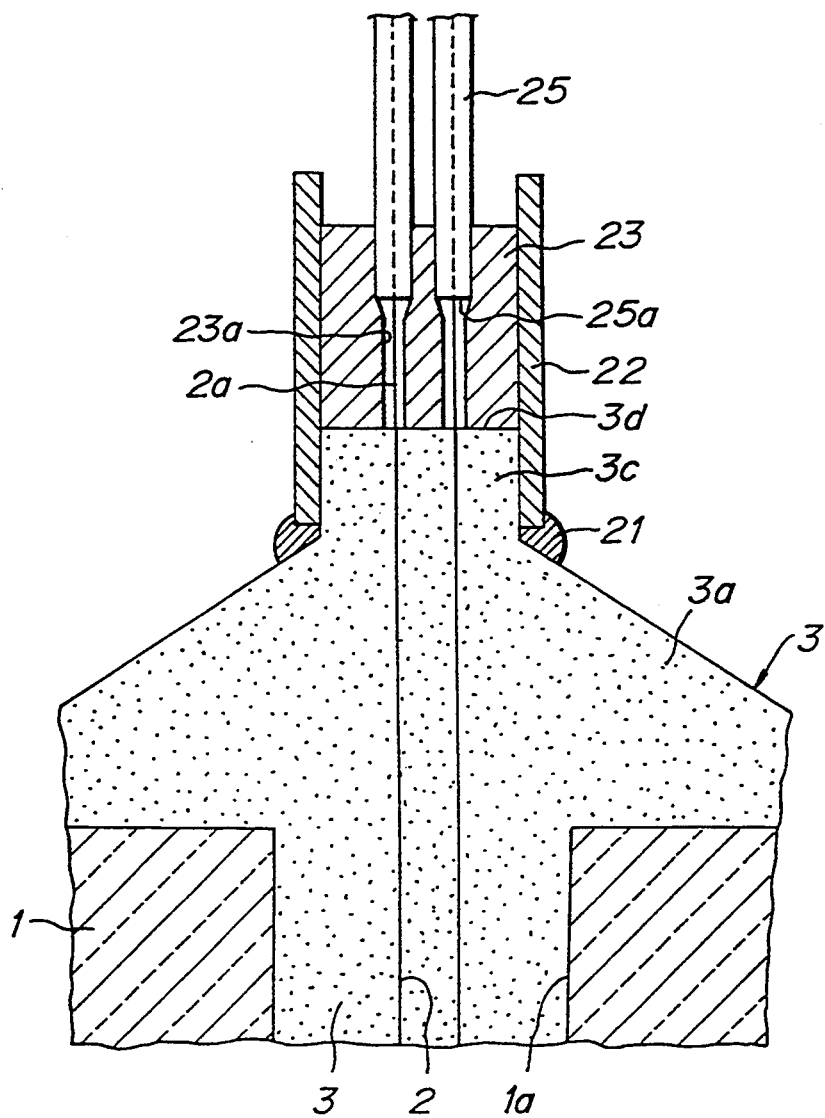
Figure 18:
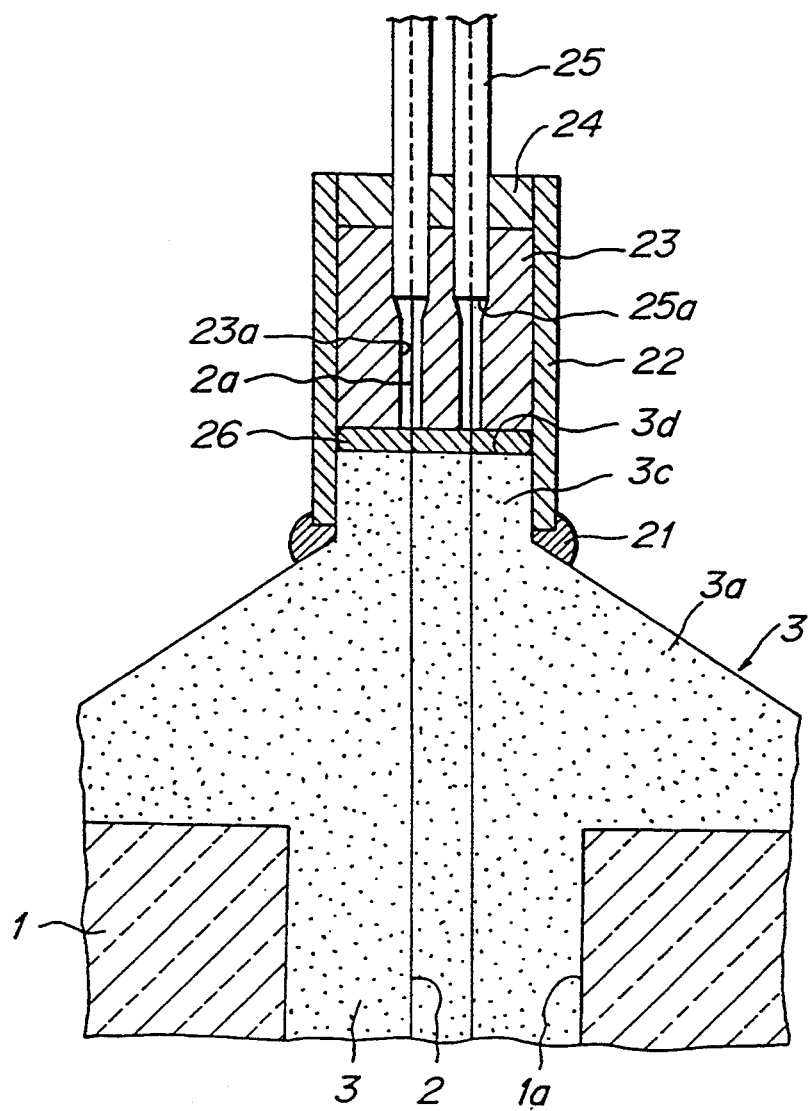
Figure 19:
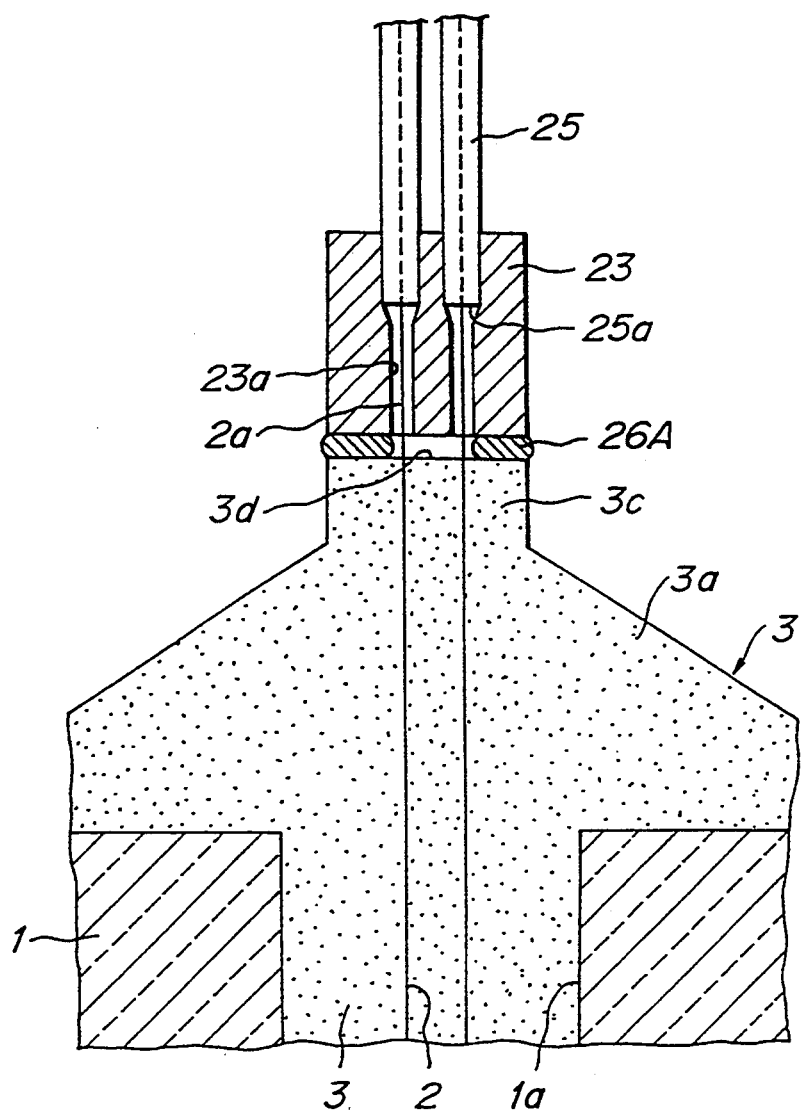
Figure 20:
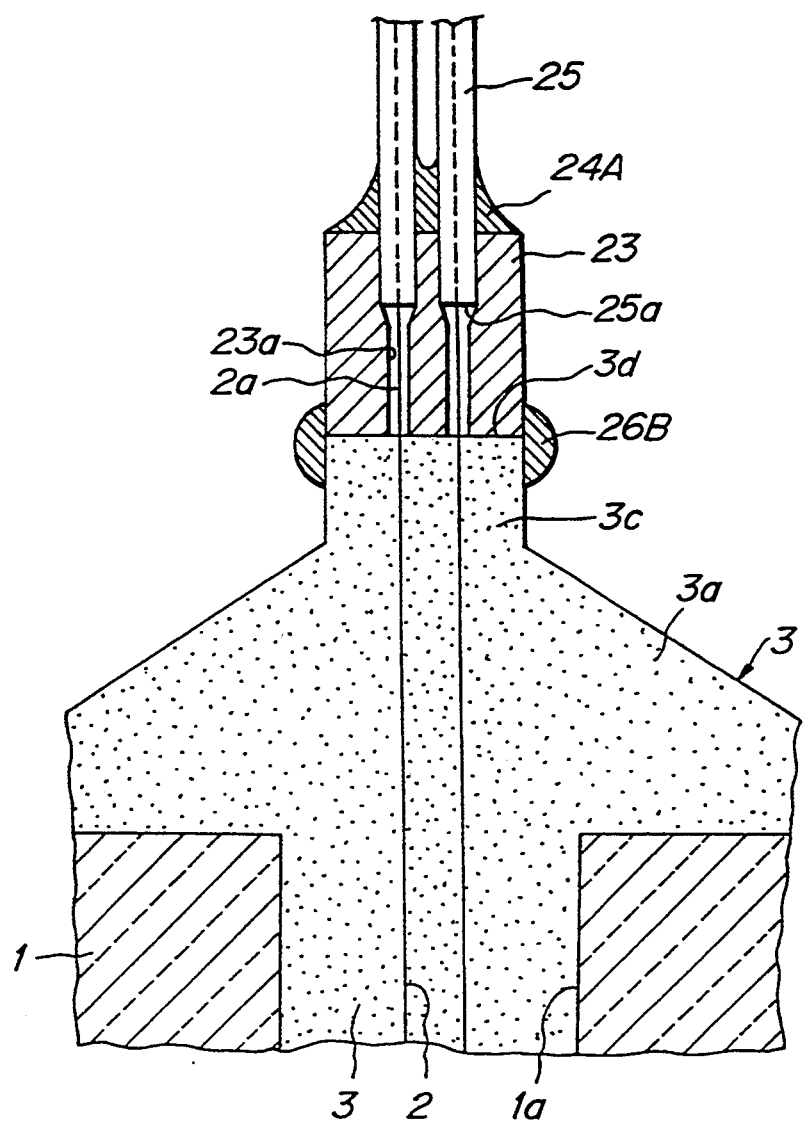
Figure 21:
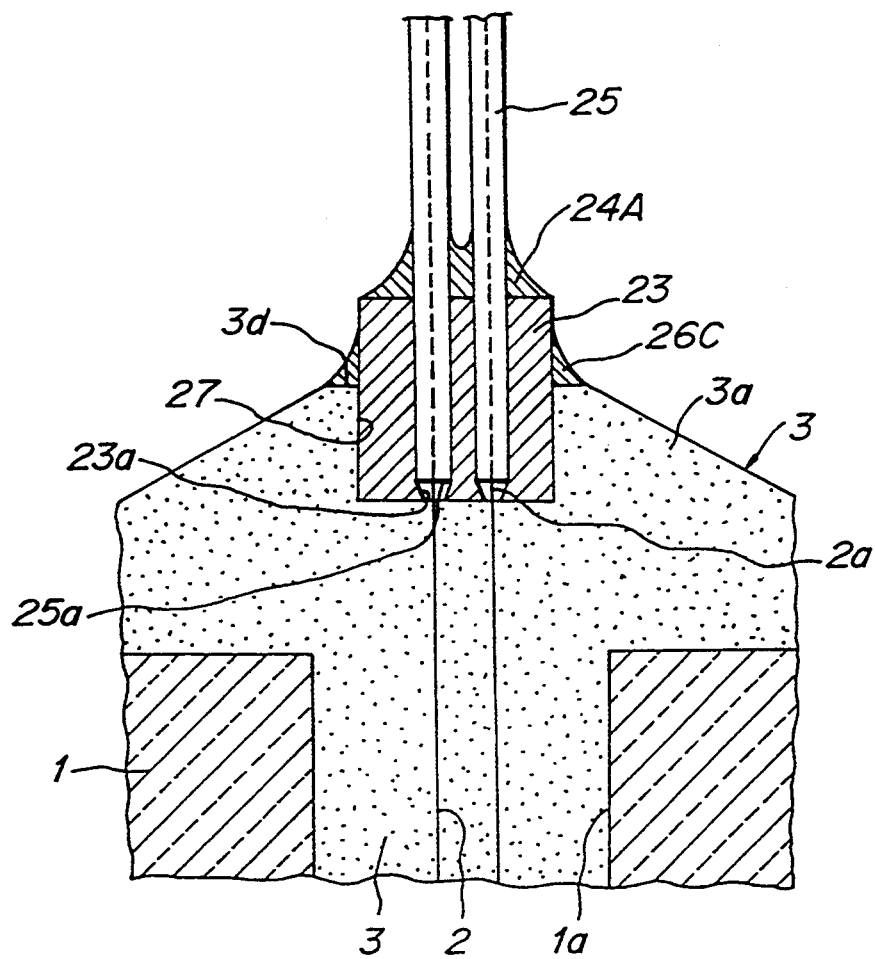
Figure 22:
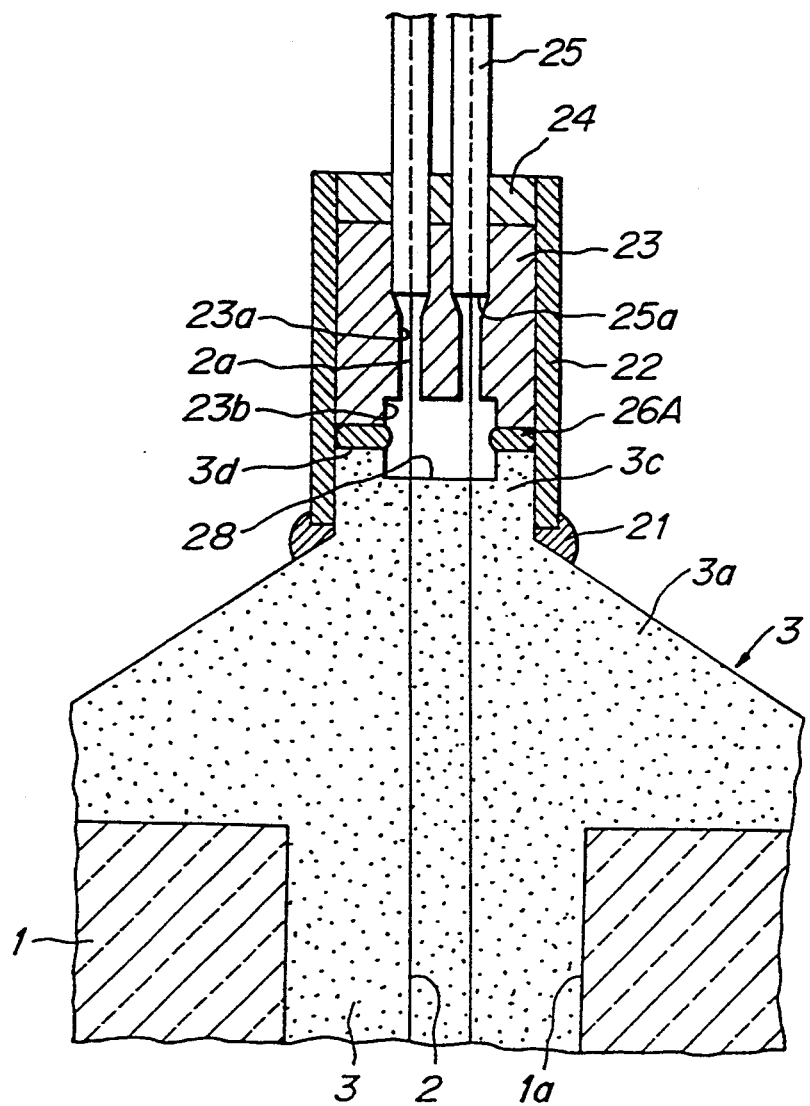

FIG. 4 is a sectional view illustrating a state in which molds 7 are set at respective end faces 1c of an insulator body 1 and an organic insulating material 3B is filled;

FIG. 5 is a graph showing the relationship between the diameter of the through hole and the depressed amount of the organic insulating material;

FIG. 6 is a graph showing the relationship between the diameter of the through hole and the light transmission loss;

FIG. 7 is a sectional enlarged view for illustrating a portion of another optical fiber composite insulator near an end face 1c;

FIG. 8 is a sectional view for schematically illustrating the entire optical fiber composite insulator;

FIG. 9 is a sectional view for schematically illustrating a still another optical fiber composite insulator in its entirety;

FIG. 10 is a sectional view for schematically illustrating a further optical fiber composite insulator near an end face 1c;

FIG. 11 is a sectional view for illustrating a still further optical fiber composite insulator near an end face 1c;

FIG. 12 is a sectional view for illustrating a still further optical fiber composite insulator near an end face 1c;

FIG. 13 is a sectional view for illustrating a state in which molds 7 are fitted to an insulator body 1 and an organic insulating material 3B is poured;

FIG. 14 is a graph showing the relationship between the height H of the swelled portion and the light transmission loss at 0° C. or −20° C.;

FIG. 15 is a graph showing the relationship between the height of the top of the swelled portion and the light transmission loss at 80° C. or −20° C.;

FIG. 16 is a sectional enlarged view of a principal portion of a further embodiment of the optical fiber composite insulator according to the present invention;

FIG. 17 is a sectional enlarged view of a principal portion of a still further embodiment of the optical fiber composite insulator according to the present invention;

FIG. 18 is a sectional enlarged view of a principal portion of a still further embodiment of the optical fiber composite insulator according to the present invention;

FIG. 19 is a sectional enlarged view of a principal portion of a still further embodiment of the optical fiber composite insulator according to the present invention;

FIG. 20 is a sectional enlarged view of a principal portion of a still further embodiment of the optical fiber composite insulator according to the present invention;

FIG. 21 is a sectional enlarged view of a principal portion of a still further embodiment of the optical fiber composite insulator according to the present invention;

FIG. 22 is a sectional enlarged view of a principal portion of a still further embodiment of the optical fiber composite insulator according to the present invention;

FIG. 23 is a graph showing the relationship between the curing temperature of the organic insulating material and the light transmission loss; and FIG. 24 is a graph showing the relationship between the elongation and changes in the light transmission loss when the optical fiber is stretched.

DETAILED DESCRIPTION OF THE INVENTION

FIG. 2 is a sectional view of an optical fiber composite insulator near an end face in an enlarged scale.

An insulator body 1 has a slender columnar shape, and a number of sheds are provided around an outer peripheral surface of the insulator body 1. A through hole 1a having an almost circular sectional shape as viewed in a diametrical direction is formed in a central portion of the insulator body 1. Through the through hole 1a are passed, for example, two optical fibers 2A and 2B. Outer peripheral portions of the insulator body 1 are fitted to respective flanges 6 through a cement layer 5 at upper and lower ends of the insulator body. An organic insulating material 3A is filled into the through hole 1a. Further, the organic insulating materials is swelled up outwardly from an end face 1c at each of upper and lower ends of the insulator body 1 to form a swelled portion 4A.

In the embodiment of FIG. 2, the swelled portion 4A has a flat discoidal shape. The optical fibers 2A and 2B are taken out upright from the central portion of the discoidal swelled portion 4A.

Figure 3A:
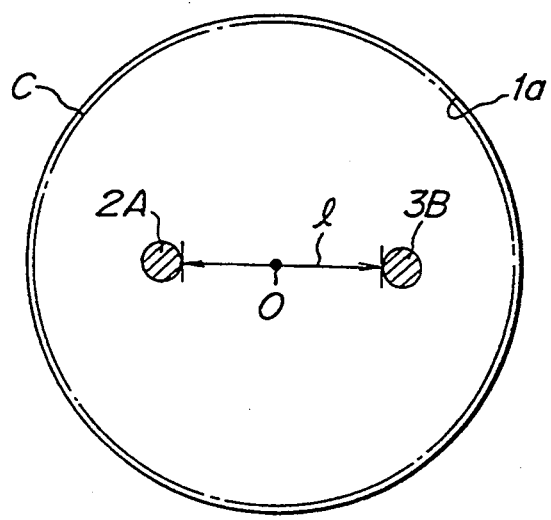
FIG. 3a is a schematically sectional view of the optical fiber composite insulator as cut in a diametrical direction of a through hole 1a for the illustration of a construction of the first aspect of the present invention.

FIG. 3(a) is a sectional view of the through hole 1a as cut in the diametrical direction. In FIG. 3(a), the organic insulating material 3A is omitted for facilitating understanding this figure.

According to the present invention, the diameter of the through hole 1a is set at not more than 13 mm. The center of a hypothetical circle C is concentric with the center O of the through hole 1a, and the diameter of the hypothetical circle C is set at not less than 95% of that of the through hole 1a. Such a hypothetical circle is drawn on any plane orthogonal to an axis of the through hole. The optical fibers 2A and 2B are located inside the hypothetical circle. The distance between the optical fibers 2A and 2B is set at not less than 0.1 mm.

By adopting the above construction, the following effects can be obtained.

That is, the present inventors have acquired the following knowledge through various investigations of causes which increase the light transmission loss at low temperatures. As the organic insulating material 3A, silicone rubber, urethane rubber, epoxy resin or the like is concretely employed. Among them, particularly silicone rubber is preferred because the rubber has excellent stress-mitigating action. Since these organic insulating materials have coefficients of thermal expansion being a few to a several tens times as great as that of the insulator body, the organic insulating material greatly shrinks inside the through hole at low temperatures. However, since the organic insulating material 3A inside the through hole 1a is firmly bonded to the wall surface of the insulator body 1, the movement of the organic insulating material is so restricted that the insulating material will not substantially shrink in a diametrical direction or in a circumferential direction of the through hole, whereas the insulating material largely shrinks only in the axial direction near end portions of the through holes 1a. Thus, when the organic insulating material 3A is displaced (i.e. depressed) near the end portions of the through hole 1a, the optical fibers 2A and 2B sealed with the insulating material are shrunk to cause the light transmission loss.

Under these circumstances, according to the present invention, it is acknowledged that when the diameter of the through hole 1a is set at not more than 13 mm, the displacement (depression) of the organic insulating material near the end portions of the through hole 1a at the low temperatures can be reduced.

The reason is considered as follows:

Since the organic insulating material 3A is bonded to the wall surface of the through hole 1a, this serves to restrict the axial shrinkage of the organic insulating material 3A. Such an effect becomes greater as the location approaches the wall surface of the through hole, whereas the effect becomes weaker as the location approaches the center of the through hole. Therefore, as the diameter of the through hole becomes smaller, the movement-restricting effect acts near the central portion of the through hole. As mentioned above, since the movement inside the through hole in the diametrical direction and the circumferential direction is restricted, the shrinkage of the organic insulating material sealingly filled in the through hole 1a concentratedly occurs as a displacement in the axial direction near the end portions of the through hole 1a. Consequently, even if the shrinkage factor of the organic insulating material is constant, the greater the diameter of the through hole 1a, the greater is the depressed amount (maximum value) of the insulating material in the axial direction. It is considered that the axial displacement of the insulating material is substantially proportional to 1.5–2 (the diameter of the through hole 1a). Therefore, as the diameter of the through hole becomes smaller, the displacement (depressed amount) of the organic insulating material near the end portion becomes smaller.

Further, according to the present invention, since the optical fibers 2A and 2B are located inside the hypothetical circle C, the optical fibers 2A or 2B will not contact the wall surface of the through hole 1a, and the organic insulating material 3A can be sufficiently filled between the optical fibers and the wall surface of the through hole. In addition, since the distance between the optical fibers 2A and 2B is set at not less than 0.1 mm, the organic insulating material 3A can be fully filled around the optical fibers 2A and 2B. By restricting the diameter of the hypothetical circle and the distance between the optical fibers as mentioned above, the organic insulating material can be uniformly distributed all around the optical fibers 2A and 2B, and insufficiently bonded portions do not occur. As a result, the insulating performance against the optical fibers can be enhanced.

The above restrictions are also applicable in the case where three or more optical fibers are passed through the through hole. For example, a case in which four optical fibers are employed will be explained with reference to FIG. 3b. The optical fibers 2A, 2B, 2C 2D are passed through the through hole 1a. In that case, it is necessary that the optical fibers 2A, 2B, 2C and 2D are all located inside the hypothetical circle C such that each of $l_{AB}$, $l_{BC}$, $l_{CD}$, $l_{DA}$, $l_{AC}$ and $l_{BD}$ is set at not less than 0.1 mm in which $l_{AB}$ is a distance between the optical fibers 2A and 2B, $l_{BC}$ is a distance between the optical fibers 2B and 2C, $l_{CD}$ is a distance between the optical fibers 2C and 2D, $l_{DA}$ is a distance between the optical fibers 2D and 2A, $l_{AC}$ is a distance between the optical fibers 2A and 2C, and $l_{BD}$ is a distance between the optical fibers 2B and 2D.

Figure 3B:
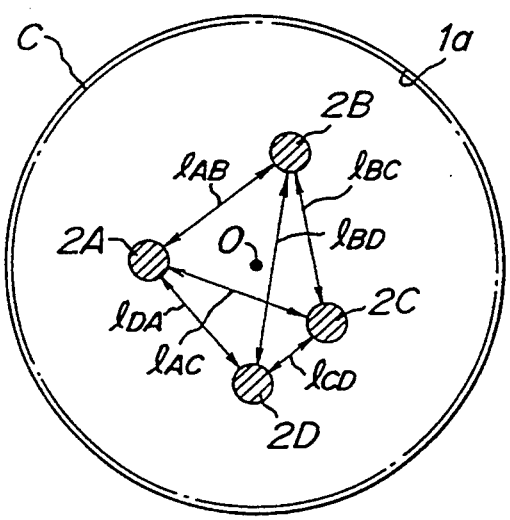

Next, a preferred process for producing the optical fiber composite insulators as shown in FIGS. 2, 3a and 3b will be explained below with reference to FIG. 4.

A mold 7 is placed on each of the end faces 1c of the insulator body 1. A swelled portion-forming space 7a is formed in the mold 7, and a through hole 7b is communicated with the swelled portion-forming space 7a. An organic insulating material-feeding pipe 9A is fitted to the lower mold 7, and an organic insulating material discharge pipe 9B is fitted to the upper mold 7. The interior of each of the pipe 9A and 9B is communicated with the through hole 7b. The mold 7 is fixed to a flange by using bolts 10, and the mold 7 and the end face 1c are gas-tightly sealed by using an O-ring 13. An insertion hole 7c is provided in a central portion of the mold 7 for passing the optical fibers therethrough. When the mold 7 is set to the end face of the insulator body, the center of the mold 7 is aligned with that of the through hole 1a.

In order to prevent contact between the optical fibers 2A and 2B inside the through hole 1a and contact between the optical fibers and the wall surface of the through hole 1a, it is preferable that the optical fibers 2A and 2B are preliminarily fixed with spacers 12 made of the same material as that of the organic insulating material 3A at three or more locations. The optical fibers 2A and 2B are geometrically arranged according to the present invention.

The optical fibers 2A and 2B are passed through the through hole 7c and the through hole 1a. A packing 8 is fitted to the through hole 7c of the mold 7. In order to prevent contact between the optical fibers 2A and 2B and contact between the optical fibers and the wall surface of the through hole 1a near the end portion of the through hole 1a, it is preferable that two through holes having substantially the same diameter as that of the optical fiber are provided in the packing 8 such that the locations of these through holes are adjusted to prevent positional deviation of the optical fibers 2A and 2B.

Further, it is preferable that the optical fibers are stretched straight by applying a tensile load to each of the optical fibers 2A and 2B. By so doing, even when the organic insulating material 3B is filled, the contacting between the optical fibers and the contacting between the optical fibers and the wall surface of the through hole can be assuredly prevented. Further, it is possible to prevent the optical fibers from being finely bent due to pressure under which the organic insulating material 3B is filled.

In order that bubbles may not be taken into the organic insulating material 3B during pouring, it is preferable that the interior of the through hole 1a is preliminarily evacuated to a reduced pressure of 1 to 3 torrs, and then the organic insulating material 3B is fed through the material-pouring pipe 9A. The insulating material 3B goes up inside the through hole 1a, and reaches the material discharge opening 9B. The swelled portion-forming space 7a and the through hole 1a are filled with the organic insulating material, which is cured by heating. Then, the molds are removed.

At that time, when the pouring pressure for the organic insulating material 3B is set at 3 to 10 kgf/cm$^2$, the insulating material can be easily uniformly poured into the through hole 1a.

In the following, specific experimental results will be explained.

EXPERIMENT 1

Optical fiber composite insulators as shown in FIGS. 2 and 3(a) were produced by the above-mentioned method shown in FIG. 4. The dimensions of the insulator body 1 were 1,150 mm in a total length, 105 mm in a barrel diameter, and 205 mm in a shed diameter. In this experiment, the height h of a swelled portion 4A was set at 3 mm, and a depressed amount of an organic insulating material in a central portion was measured. As optical fibers 2A and 2B, quartz base optical fiber filaments were used. As the organic insulating material 3B, liquid silicone rubber, which had a viscosity of 500 to 1,000 poises before curing, was used.

The diameter of the through hole 1a of the insulator bodies 1 were varied in various ways as shown in FIGS. 5 and 6, and the average displacement (depressed amount) of the organic insulating material at the end face at −20° C. and the light transmission loss at −20° C. were measured with respect to each insulator. Results are shown in FIGS. 5 and 6. The light transmission loss at −20° C. was obtained as a ratio of a light-transmitted amount at −20° C. to that at room temperature (25° C.).

In this experiment, the optical fibers 2A and 2B were arranged through a circumference of a hypothetical circle coaxial with the through hole 1a and 30% of the diameter of the through hole 1a, while the optical fiber 2A was point-symmetrical with the optical fiber 2B around the center O of the through hole. Therefore, when the diameter of the through hole 1a is 4 mm, the distance between the optical fibers 2A and 2B is 1.2 mm.

As is seen from FIG. 6. the light transmission loss at −20° C. rapidly increased at a point of time when the diameter increased to 13 mm. Further, as the diameter of the through hole increases, the depressed amount of the organic insulating material increases.

EXPERIMENT 2

Optical fiber composite insulators as shown in FIG. 3 were produced by the above-mentioned method shown in FIG. 4. The dimensions of the insulator body 1 were 1,150 mm in a total length, 105 mm in a barrel diameter, and 205 in a shed diameter. As optical fibers 2A and 2B, quartz base optical fiber filaments were used. The outer diameter of the coated fiber filament with an ultraviolet ray-curable resin was 0.4 mm. As an organic insulating material 3B, liquid silicone rubber having a viscosity of 500 to 1,000 poises before curing was used.

Arrangement of the optical fibers 2A and 2B were changed in various ways, and insulating performance of the optical fiber composite insulators was evaluated.

Concretely, the distance between the optical fibers 2A and 2B were varied as shown in Table 1 . At the same time, a hypothetical circle passing either the optical fiber 2A and 2B remoter from the center O and having the center O of the through hole as its center was taken, and a ratio of the diameter of the hypothetical circle to that of the through hole was varied as shown in Table 1. With respect to each sample in Table 1, five insulator bodies with the through holes 1a each having the diameter of 6 mm and five insulator bodies with the through holes each having the diameter of 10 mm were prepared, and tested. That is, a total of ten insulator bodies were prepared for each sample.

As a standard sample, five insulator bodies with the through holes 1a each having the diameter of 6 mm and five insulator bodies with the through holes 1a each having the diameter of 10 mm were also prepared, and tested. That is, a total of ten insulator bodies were prepared for the standard sample. In each of the insulators as the standard sample, only one optical fiber was passed through the center of the through hole 1a such that the optical fiber might not contact the wall surface of the through hole.

Insulating performance was evaluated by measuring the flashover voltage of each of the optical fiber composite insulators, determining the average flashover voltage of the ten insulators, and relatively evaluating it with reference to the average value of the standard sample being taken as 1.0. As a reference sample, two optical fibers were contacted with each other and the optical fibers were also contacted with the wall surface of the through hole, which was considered to deteriorate greatly the insulating performance. With respect to the reference sample, a total of ten insulators were prepared as mentioned above, and their relative values of the flashover voltages were measured to be 0.70.

Relative values of the flashover voltages of the Standard sample, Invention samples, Comparative samples and Reference sample are shown in Table 1.

TABLE 1

| | Ratio of the diameter of a hypothetical circle encompassing the optical fibers to that of the through hole (%) | Minimum distance between optical fibers (mm) | Flashover voltage (relative value) |
| --- | --- | --- | --- |
| Standard Sample | — | — | 1.00 |
| Invention samples | 50 | 0.2 | 1.00 |
| | 70 | 0.5 | 1.00 |
| | 90 | 0.1 | 0.95 |
| | 95 | 0.3 | 0.97 |
| Comparative samples | 97 | 0.2 | 0.83 |
| | 80 | 0.05 | 0.79 |
| Reference samples | The optical fiber(s) contacted the wall of the through hole. | The optical fibers contacted each other | 0.70 |

As is seen from Table 1, when the diameter of the hypothetical circle on which the remoter optical fiber is located becomes 97% of the diameter of the through hole, insulating performance drops. The insulating performance is also deteriorated when the distance between the optical fibers 2A and 2B was 0.05 mm. In addition, it is more preferable that the diameter of the hypothetical circle on which the remoter optical fiber is located is not more than 70% of the diameter of the through hole. Furthermore, it is more preferable that the distance between the optical fibers is not less than 0.2 mm.

As mentioned above, according to the present invention, since the diameter of the through hole is not more than 13 mm, the displacement (depressed amount) of the organic insulating material near the end portion of the through hole at low temperatures can be reduced and the light transmission loss at low temperatures can be reduced. In addition, since the optical fibers are located inside the hypothetical circle having the diameter being 95% of that of the through hole, the contacting between the optical fibers and the wall surface of the through hole can be prevented, and the organic insulating material can fully go around between the optical fibers and the wall surface of the through hole. Further, since the distance between any two optical fibers is set at not less than 0.1 mm, the organic insulating material can fully be distributed around between the optical fibers. As a result, since the organic insulating material can fully go around the optical fibers, insufficient contact between the organic insulating material and the optical fibers can be prevented to improve the insulating performance for the optical fibers.

Then, the second aspect of the present invention will be explained below.

FIG. 7 is a sectional view illustrating an optical fiber composite insulator near an end face in an enlarged scale, and FIG. 8 is a sectional view illustrating another entire optical fiber composite insulator.

An insulator body 1 has a slender columnar shape, and is provided with a number of sheds 1b at its outer peripheral surface. A circular-section through hole 1a is formed in a central portion of the insulator body 1. Through the through hole 1a are passed, for example, two optical fibers 2. Each of upper and lower surface portions of the insulator body 1 is fitted to a flange 6 through a cement layer 5 at an outer peripheral portion. An organic insulating material 3A is filled into the through hole 1a. The organic insulating material 3A is swelled up outwardly from the end face 1c at each of the upper and lower ends of the insulator body 1 to form a swelled portion 4A.

In the embodiment of FIG. 7, the swelled portion 4A consists of three portions. That is, a frusto-conical portion 4a is formed concentrically with the through hole 1a, and a columnar top portion 4c is formed on a central portion of the frusto-conical portion 4a. A relatively thin extension portion is formed at a skirt portion of the outer peripheral edge of the frusto-conical portion 4a. The optical fibers 2 are passed through the frusto-conical portion 4a and the cylindrical columnar top portion 4c, and taken out through a tip end face of the columnar top portion 4c.

The present inventors have made various investigations on causes which increase the light transmission loss at low temperatures, and obtained the following knowledge.

As the organic insulating material, silicone rubber, urethane rubber, epoxy resin or the like may be concretely used. since these organic insulating materials have coefficients of thermal expansion being a few to several tens times as great as that of the insulator body, the swelled portion of the organic insulating material is greatly shrunk at low temperatures. On the other hand, since the organic insulating material inside the through hole is firmly bound to the wall surface of the through hole of the insulator body, the movement of the insulating material is so restricted that the insulating material cannot so shrink even at low temperatures.

As mentioned above, it has been a conventional practice to absorb the expansion of the insulating material at high temperatures by increasing the height of the swelled portion. However, the swelled portion is largely shrunk at low temperatures so that strain occurs inside the organic insulating material near an opening at the end of the through hole. As a result, microbending occurs in the optical fibers sealed near the opening at the end of the through hole, which causes the light transmission loss.

Based on the above knowledge, the present inventors have discovered that when the height H from the end face 1c of the insulator body 1 to the tip of the swelled portion 4A is set at not more than 40 mm, the light transmission loss at low temperatures can be largely reduced. The reason why such an effect can be obtained is considered that when the height H is thus restricted, the strain inside the organic insulating material near the opening at the end of the round through hole 1a can be largely reduced even at low temperatures, and the microbending of the optical fibers there can be prevented.

Furthermore, the present inventors have made various investigations on causes to reduce bonding forces on long-term use at the bound interface between the swelled portion made of the organic insulating material and the end face of the insulator body, and discovered that the bonded length l from the outer peripheral edge A of the through hole 1a to the outer peripheral edge B of a portion of the swelled portion bonded to the end face of the insulator body is important. Specifically, when the bonded length l is set at not less than 1 mm but not more than 35 mm, the swelled portion does not peel from the end face of the insulator body.

The reason therefor will be further explained. When the bonded length l is small, the terminal end of the bonded interface between the round through hole 1a and the organic insulating material 3A is directly exposed. When the surrounding temperature changes, the organic insulating material 3A expands or shrinks. Since the organic insulating material 3A is firmly restricted inside the through hole 1a in the radial direction by the wall surface of the insulator body, the insulating material expands or shrinks only in the axial direction. Consequently, large tensile stress occurs in the axial direction of the round through hole 1a near the opening at the end of the round through hole 1a. If the terminal end of the bonded interface between the round through hole 1a and the organic insulating material 3A is directly exposed near the location where the large tensile stress acts, the bonding forces there is likely to decrease.

On the other hand, the organic insulating material in the swelled portion 4A has room to expand or shrink freely to some degree even in the radial direction and in the axial direction different from a case where the insulating material is located inside the round through hole 1a. Therefore, the stress applied to the outer peripheral edge B of the bonded portion is far smaller than that acting upon the outer peripheral edge A of the round through hole 1a. Thus, the organic insulating material is difficult to peel from the terminal end of the bonded portion.

Furthermore, according to the inventors' investigations, if the bonded length is too great, the bonding forces are likely to decrease. This is because when the surrounding temperature changes, the axially displaced (expanded or shrunk) absolute amount of the swelled portion 4A increases. As a result, a large tensile stress occurs along the end face 1c at the outer peripheral edge B of the bonded portion between the organic insulating material and the end face 1c.

When the bonded length l from the outer peripheral edge A of the round through hole 1a to the outer peripheral edge B of the bonded portion is set at not more than 35 mm in accordance with the present invention, a radially expanded or shrunk absolute amount of the swelled portion 4A following change in temperature can be reduced. As a result, a tensile stress occurring at the outer peripheral edge B of the bonded portion between can be reduced. Accordingly, even when the organic insulating material 3A expands or shrinks with changes in the surrounding temperature, the bonding forces at the bonded interface is difficult to decrease so that the optical fiber composite insulator having excellent insulating performance for a long term can be obtained.

FIG. 9 is a sectional view for schematically illustrating an entire optical fiber composite body in which a plurality of insulator bodies 1 are piled one upon another at plural stages. The same reference numerals in FIGS. 7 and 8 are given to the same parts as in FIGS. 7 and 8. Two or more insulator bodies 1 are prepared, and integrated by connecting flanges 6 of the insulator bodies 1 by means of bolts 10. To such a composite insulator in which the insulator bodies 1 are piled together in plural stages is applicable the present invention, and a swelled portion 4A can be formed on an end face 1c of the insulator body.

The shape of the swelled portion may be varied in the form of 4B, 4C or 14 as shown in FIG. 10, 11 or 12. In the embodiment of FIG. 10, an extension portion 4b is formed at a skirt of an outer peripheral edge of a frusto-conical portion 4a as in FIG. 7. A flat round top portion 4d is formed on a central portion of the frusto-conical portion 4a. In the embodiment of FIG. 11, an extension portion 4b is formed at a skit of an outer peripheral edge of a frusto-conical portion 4a, too. A recessed portion 4e is formed in a central portion of the frusto-conical portion 4a as a top portion. In the embodiment of FIG. 12, a swelled portion 14 consists of a discoidal portion 14a around a through hole 1a as its center and a columnar top portion 14b formed on a central portion of the discoidal portion 14a.

When the main portion of the swelled portion 4A, 4B or 4C is shaped in a frusto-conical form, the following effects can be obtained.

That is, the expansion or shrinkage of the organic insulating material due to changes in the surrounding temperature is uniformly released in radial directions, so that the expansion or shrinkage of the organic insulating material can be reduced in the axial direction. Therefore, the optical fiber composite insulator having excellent light transmittability and being free from warping of the optical fiber can be obtained.

In addition, when the top portion of the frusto-conical portion 4a or the discoidal portion 14a is formed in the columnar shape, the columnar top portion 4c, 14b shrinks equally in the radial directions and in the axial direction. However, since the other frusto-conical portion or the discoidal portion excluding the columnar portion 4c, 14b is bonded to the end face 1c of the insulator body, the organic insulating material is difficult to shrink in the radial direction but easy to shrink in the axial direction. Therefore, the axially shrunk amount of the organic insulating material at the columnar top portion 4c, 14b becomes smaller than the axially shrunk amount at the other frusto-conical portion or the other discoidal portion. Strain occurs inside the organic insulating material at the root of the columnar top portion 4c, 14b by an amount corresponding to a difference in shrinkage. In this case, it was discovered that when a height h of the columnar top portion 4c, 14b is set at not more than 5 mm, the above shrinkage difference becomes extremely small, so that no strain occurs inside the organic insulating material near the root of the columnar top portion 4c, 14b. Owing to this, since no microbending occurs in the optical fiber near the root of the cylindrical columnar top portion 4c, 14b, the light transmission loss at low temperatures can be further decreased. When the top portion is flat at 4d, the height of the top portion is 0 mm, so that no such a problem occurs.

When the top portion of the frusto-conical portion 4a or the discoidal portion 14a is provided with a recess 4e, the expansion of the organic insulating material in the radial direction is restricted at high temperatures by a peripheral surface of the recess 4e near the bottom face of the recess 4e. As a result, the recess is enlarged near the bottom portion. Accordingly, strain occurs upon a root portion of the optical fiber projecting from the bottom of the recess.

In this case, when a height h of the recess 4e is set at not more than 5 mm, the radial expansion of the organic insulating material is not restricted near the bottom surface of the recess 4e and no strain occurs at the root of the optical fiber, so that the light transmission loss at high temperature is further reduced.

In FIGS. 7 and 12, the top portion 4c, 14b has a columnar shape. In this case, it is preferable that the radius of the surface at the top is not less than 3 mm. By so doing, portions of the optical fibers taken out from the organic insulating material are reinforced with the top portion 4c, 14b, and even when the optical fibers projecting outwardly from the sealed portion are swayed due to vibrations resulting from inevitable forces during working or earthquakes, the optical fibers are not damaged at the taken-out portions.

Next, a method for producing the optical fiber composite insulators as shown in FIGS. 7 through 12 will be explained with reference to FIG. 13.

A mold 7 is placed on each of upper and lower end faces 1c of an insulator body 1. A swelled portion-forming space 7a is formed in the mold 7, and a through hole 7b is communicated with the swelled portion-forming space 7a. An organic insulating material-feeding pipe 9A is fitted to the lower mold 7, and an organic insulating material discharge pipe 9B is fitted to the upper mold 7. The interior of each of the pipes 9A and 9B is communicated with the through hole 7b. Each mold 7 is fixed to a flange 6 by bolts 10, and the mold 7 and the end face 1c are gas-tightly sealed by an O-ring 11. Optical fibers 2 are passed through the optical fiber-inserting hole 7c of the mold 7, and stretched over through the round through hole 1a. A vacuum packing 8 is set at the optical fiber-inserting hole 7c of each of the molds 7.

While the optical fibers 2 are stretched straight under application of appropriate tensile stress, the interior of the round through hole 1a is evacuated to vacuum, and an organic insulating material 3B is poured the material-pouring pipe 9A. The material 3B rises inside the round through hole 1a, and reaches the material-discharge opening 9B. The swelled portion-forming space 7a and the round through hole 1a are filled with the organic insulating material 3B, which is cured by heating. Thereafter, the molds 7 are removed.

By the above method, the optical fiber composite insulators shown in FIGS. 7 through 12 can be produced at high efficiency. In addition, it is effective to apply tensile stress upon the optical fiber 2 during the filling, heating and curing of the material 3B. By so doing, the light transmittability of the optical fiber can be well maintained through before and after the curing by the heating.

In the following, concrete experimental results will be explained.

EXPERIMENT 3

Optical fiber composite insulators as shown in FIG. 7 were produced by the method shown in FIG. 13. As an organic insulating material, addition type silicone rubber was used, and a heating curing temperature was set at 70° C. to 90° C. The dimensions of the insulator bodies were 950 mm in a total length, 105 mm in a barrel diameter, and 205 mm in a shed diameter. A bonded length l was 20 mm, and a height of a columnar top portion 4c was 3 mm. A height H of a swelled portion 4A was varied as shown in FIG. 14, and a light transmission loss at low temperatures was measured. Results are shown in FIG. 14.

In FIG. 14, the light transmission loss at 0° C. and the light transmission loss at −20° C. are shown. The light transmission losses at 0° C. and −20° C. were obtained as a ratio of a light-transmitted amount at 0° C. or −20° C. to that at 25° C.

As is seen in FIG. 14, when the height H exceeds 40 mm, the light transmission loss at low temperatures rapidly increases. This tendency is almost similarly observed at 0° C. and −20° C.

EXPERIMENT 4

Optical fiber composite insulators were produced in the same manner as in Experiment 3. The height H of the swelled portion 4A was set at 40 mm, and the height of the columnar top portion 4c was set at 3 mm. A bonded length l was varied in various ways as shown in Table 2, and bonding forces between the organic insulating material and the end face of the insulator body were evaluated. Specifically, with respect to each sample, three optical fiber composite bodies were prepared for each bonded length l and each cycle, and heating/cooling were repeated at a given number of times to apply cooling/heating cycles between −20° C. and 80° C. to the insulators. Then, bonding forces between the organic insulating material and the end face of the insulator body were evaluated. The bonding forces were evaluated by pulling upwardly the organic insulating material in the swelled portion and examining whether the organic insulating material undergoes cohesive failure or the organic insulating material peeled from the end face of the insulator body. Samples were evaluated by "⊚", "○" and "x". The symbols "⊚", "○" and "x" mean the following:

"⊚" ... All three insulators underwent cohesion failure
"○" ... In one or more of three insulators, the organic insulating material peeled from the insulator end face.
"x" ... In all three insulators, the organic insulating material peeled from the insulator end face.

Results are shown in Table 2. As is seen from Table 2, when the bonded length l is set at 1 to 35 mm, the bonding forces are great.

TABLE 2

|  | Bonded length (mm) | Evaluation of bonding forces of organic insulating material | | |
| --- | --- | --- | --- | --- |
|  |  | 1000 cycle | 2000 cycle | 3000 cycle |
| Invention Examples | 1 | ⊚ | ⊚ | ⊚ |
|  | 5 | ⊚ | ⊚ | ⊚ |
|  | 10 | ⊚ | ⊚ | ⊚ |
|  | 15 | ⊚ | ⊚ | ⊚ |
|  | 20 | ⊚ | ⊚ | ⊚ |
|  | 30 | ⊚ | ⊚ | ⊚ |
|  | 35 | ⊚ | ⊚ | ⊚ |
| Comparative Examples | 0.2 | ⊚ | ○ | X |
|  | 0.5 | ⊚ | ○ | ○ |
|  | 40 | ⊚ | ○ | ○ |
|  | 80 | ⊚ | ○ | X |

EXPERIMENT 5

Insulator bodies each having a total length of 950 mm, a barrel diameter of 105 mm and a shed diameter of 205 mm were piled at two stages. As an organic insulating material, silicone rubber was used, and optical fiber composite insulators as shown in FIG. 7, 10 or 11 were produced. A height of a swelled portion 4A, 4B, 4C was set at 25 mm, and a diameter of a bottom surface of a frusto-conical portion 4a was set at 60 mm. A shape and a height of a top portion were varied as shown in FIG. 15, and light transmission losses at 80° C. and −20° C. were measured. Results are shown in FIG. 15. Each of the light transmission losses was obtained as a ratio of a light-transmitted amount at 80° C. or −20° C. to that at 25° C.

As is seen from FIG. 15, when the height h is set at not more than 5 mm, the light transmission loss can be largely reduced. Further, when the swelled portion of the insulator includes a recessed top portion and the height h is greater than 5 mm, the light transmission loss at 80° C. becomes greater. When the insulator is provided with the columnar top portion (FIG. 7) and the height h is great, the light transmission loss particularly at −20° C. increases.

As mentioned above, according to the present invention, since the height from the end face of the insulator body to the tip of the swelled portion is set at not more than 40 mm, the strain inside the organic insulating material near the opening at the end of the through hole can be largely reduced, and microbending of the optical fiber at this portion can be prevented. Thereby, the light transmission loss at low temperatures can be largely reduced.

Since the bonding length from the outer peripheral edge of the through hole to the outer peripheral edge of the bonded portion of the swelled portion to the end face of the insulator body is set at not less than 1 mm but not more than 35 mm, reduction in the bonding forces of the swelled portion can be prevented, so that the optical fiber composite insulators maintaining excellent insulating performances for a long time can be obtained.

FIGS. 16 through 18 are sectional views of principal portions of optical fiber composite insulators according to the third aspect of the present invention in an enlarged scale. The same reference numerals in FIG. 1 are given to the same parts as in FIG. 1, and their explanation is omitted.

In the following, a method for producing the composite insulators shown in FIGS. 16 through 18 will be explained. First, optical fibers 2 are passed through a through hole 1a of an insulator body 1, and an organic insulating material is forcedly poured and filled into the through hole 1a under vacuum. Then, the organic insulating material is cured by heating. As the organic insulating material, silicone rubber, urethane rubber, epoxy resin or the like is preferred.

Then, a holder 23 is set on an end face 3d. The holder 23 is formed with, for example, two columnar insertion holes 23a. Optical fibers 2 projecting from the end face 3d are stretched straight in a perpendicular direction, and passed through the respective insertion holes 23a, and the holder is moved down.

Thereafter, in the case of the embodiment of FIG. 16, an adhesive is applied to a bottom surface of the holder 23, and the holder 23 is firmly fixed to the end face 3d through the adhesive layer 26. At that time, the locations of the insertion holes 23a are aligned with respective taken-out locations of the end face for the optical fibers 2 so that the optical fibers may not be bent. Next, non-sealed portions of the optical fibers 2 are inserted through the respective protective tubes 25, and a tip of each of the protective tubes is inserted into the insertion hole 23a. A part of the optical fiber is exposed between an end face 25a of the protective tube 25 and the end face 3d of the organic insulating material. It is preferable to insert the protective tube 25 into the holder 23 by an amount equal to about half of the height of the holder 23. The exposed portion 2a of the optical fiber 2 and the end face 25a of the protective tube 25 are held in the insertion hole 23a.

In the embodiment illustrated in FIG. 17, the same procedure as in FIG. 16 is effected until the holder 23 is set on the end face 3d. However, after the holder 23 is set, no adhesive layer 26 is provided different from the embodiment of FIG. 16, and a cylindrical member 22 is arranged around an outer periphery of the holder 23, thereby fixing the holder 23. The inner wall surface of the cylindrical member 22 is butted against the outer periphery of the holder 23 to hold the holder 23. At that time, it is preferable that an adhesive layer 21 is provided at the lower end of the cylindrical member 22, and the cylindrical body 22 is fixedly bonded to the swelled portion 3 with the adhesive layer. Further, a thermally shrinkable tube is more preferably used as the cylindrical member 22, because the holder 23 is more firmly fixed. Thereafter, the non-adhered portions of the optical fibers 2 are inserted into the protective tubes, and the tips of the protective tubes 25 are inserted into the respective insertion holes 23. A part of the optical fiber is exposed between the end face 25a of the protective tube 25 and the end face 3d of the organic insulating material. It is preferable that the protective tube 25 is inserted into the holder 23 by an amount equal to about a half of the height of the holder 23. The exposed parts of the optical fibers and the end faces 25a of the protective tubes 25 are held inside the respective insertion holes 23a.

In the embodiment shown in FIG. 18, the holder 23 is fixed onto the end face 3d of the insulating material 3 by using an adhesive layer 26 and a cylindrical member 22. The organic insulating material is cured by heating. In the same manner as in the embodiment of FIG. 16, the holder 23 is set on the end face 3d, an adhesive is applied to the bottom surface of the holder 23, and the holder is firmly fixed onto the end face 3d through an adhesive layer 26. Then, in the same manner as in the embodiment of FIG. 17, the cylindrical member 22 is arranged around the outer periphery of the holder 23. Then, in the same manner as in the embodiments of FIGS. 16 and 17, the protective tubes 25 are inserted into the respective insertion holes 23a of the holder 23.

According to the above embodiments, the locations through which the optical fibers are taken out are aligned with the locations of the insertion holes 23a, and the exposed portions of the optical fibers 2 and the tip portions of the protective tubes 25 are held inside the insertion holes 23a. Therefore, the optical fibers are not bent at all at the exposed portions 2a. Further, since the optical fibers are fixed by the holder near the end face 25a, no excess load is applied to the optical fiber near the end face 25a even when the protective tube is bent or swayed. Therefore, the optical fiber composite insulator having excellent light transmittability can be obtained.

Further, in the embodiment shown in FIG. 18, the holder 25 is fixed to the end face 3d by means of the adhesive layer 26, the cylindrical member 22, and the adhesive 21. Therefore, as compared with the embodiment in FIGS. 16 and 17, the holder 23 is more firmly fixed onto the end face 3d so that the optical fiber composite insulator provided with the protective tube 25 having greater resistance to the bending or swaying and possessing stably excellent light transmittability can be obtained.

Furthermore, in the embodiment of FIG. 18, the holder 23 is held inside the cylindrical body 22, a molding layer 24 is formed on the holder 23, and the protective tubes 25 are further fixed by the molding layer 24. Thus, the movement of the protective tubes 25 is further restricted on the upper side of the protective tube 23, so that even when the protective tube is swayed or bent, such does not almost influence near the end face 25a. Thereby, the light transmission loss can be further reduced.

The dimension of the holder 23 may be changed in various ways. In general, it is preferable that the diameter is set at 5 to 20 mm, and the height is set at 3 to 15 mm. The holder 23 may be made of a rubbery elastic material, and the diameter of the insertion hole 23c may be substantially equal to or smaller by up to about 0.6 mm than the outer diameter of the protective tube 25. When the holder 23 is made of the rubbery elastic material and the diameter of the insertion hole 23 is made smaller than the outer diameter of the protective tube 25, the tip of the protective tube 25 is inserted into the insertion hole 23c, while the opening of the insertion hole 23c is slightly being widened. In this case, the tip portion of the protective tube is pressed and fixed by shrinking forces of the rubbery elastic material, the location of the protective tube on the end face is more difficult to deviate. Therefore, the light transmittability is further improved.

As the organic insulating material 3, silicone rubber, urethane rubber, epoxy resin or the like is preferred. As a material for the protective tube 25, teflon or silicone rubber is preferably used, because such improves durability. As the rubbery elastic material capable of constituting the holder, silicone rubber, urethane rubber, butyl rubber, ethylene.propylene rubber, hyparon, or the like is preferred.

In the embodiment of FIG. 19, the holder 23 is bonded to the end face 3d in the same manner as in FIG. 16. However, in FIG. 19, the adhesive layer 26A is provided only on the bottom surface of the holder 23 and the peripheral edge portion of the end face 3d in an annular shape, while a space is defined inside the adhesive layer 9A.

In an embodiment of FIG. 20, a bottom face of a holder 23 is directly contacted with the end face 3d, and the holder 23 is bonded to the end face by applying an adhesive onto a lower outer peripheral surface of the holder 23 and an upper outer peripheral surface of a columnar top portion 3c. Further, a molding layer 24A is directly swelled upwardly from an upper end face of the holder 23.

In an embodiment of FIG. 21, a round recess 27 is formed in a central portion of a frusto-conical portion 3a, and a lower half portion of a holder 23 is fixedly received in the recess 27. An adhesive 26C is applied to an exposed outer peripheral surface of the holder 23 to fix the holder to an upper face of an organic insulating layer 3, and molding layer 24A is heaped on an upper end face of the holder 23.

In an embodiment of FIG. 22, a round recess 28 is provided in a central portion of a columnar top portion 3c. A round recess 23b is also provided in a lower end portion of the holder 23, and the recess 27 is opposed to the recess 23b. The holder 23 is bonded to the columnar top portion 3c with an adhesive 26A, and the outer peripheries of the holder 23 and the columnar top portion 3c are held by a cylindrical member 22. A lower end of the cylindrical member 22 is bonded to the organic insulating material with an adhesive 21. A molding layer 24 is provided on an upper side of the holder 23 inside the cylindrical body 22.

In the following, experimental results will be concretely explained.

EXPERIMENT 6

With respect to each of the embodiments shown in FIGS. 16, 17 and 18, five optical fiber composite insulators were prepared, and a light-transmitted amount before the treatment of end portions and that after the treatment of the end portions were measured with respect to each optical fiber composite insulators. Ratio between the light-transmitted amounts before and after the treatment are shown in Table 3 as changes in the light transmission losses due to the treatment of the end portions.

TABLE 3

| | Sample No. | Change in light transmission loss through the treatment of the ends (Amount of transmitted light after treatment of ends/ Amount of transmitted light before treatment of ends) | |
|---|---|---|---|
| FIG. 16 | 1 | 0.96 | Invention |
| | 2 | 0.98 | Examples |
| | 3 | 0.97 | |
| | 4 | 0.97 | |
| | 5 | 0.99 | |
| FIG. 17 | 6 | 0.94 | |
| | 7 | 0.97 | |
| | 8 | 0.96 | |
| | 9 | 0.95 | |
| | 10 | 0.94 | |
| FIG. 18 | 11 | 0.67 | Comparative |
| | 12 | 0.74 | Examples |
| | 13 | 0.58 | |
| | 14 | 0.82 | |
| | 165 | 0.71 | |

It is seen from Table 3 that the average light transmission loss is conspicuously large in the case of Sample Nos. 11–15, and ranges from 0.58 to 0.82 with great variations.

EXPERIMENT 7

With respect to each of the embodiments of FIGS. 16, 17 and 18, five optical fiber composite insulators were prepared, and a holding force of the holder was measured with respect to each optical fiber composite insulator. As the holding forces were taken forces at which the holder began to slip in case that forces were applied from a peripheral side of the holder. Results are expressed as relative values by taking the holding forces of the holder in FIG. 18 as 100. The average value for the five insulators is shown in Table 4 with respect to each embodiment. As a result, it is seen that the holding forces of the holder in the embodiment of FIG. 18 is greatest.

TABLE 4

| | FIG. 16 | FIG. 17 | FIG. 18 |
|---|---|---|---|
| Holder-holding power | 93 | 71 | 100 |

According to the present invention, the holder is placed on the end face of the organic insulating material, the locations of the insertion holes of the holder are aligned with the locations through which the optical fibers are taken out, and a part of each of the protective tube is held inside the insertion hole. Thus, the optical fiber is not bent at an exposed portion. Further, since the protective tubes are fixed by the holder near the end faces, no excess load is applied to the optical fiber near the end face even when the protective tube is bent or swayed. Thus, the optical fiber composite insulators having excellent light transmittability can be obtained.

In the following, the fourth aspect of the present invention will be explained, which is directed to a method for producing the optical fiber composite insulators. The producing method will be explained based on an optical fiber composite insulator as shown in FIG. 8. First, a through hole 1a is provided in a central portion of an insulator body 1, and then at least one optical fiber (in this embodiment, two optical fibers) is passed through the through hole 1a. In this state, the entire insulator body 1 is held at a given temperature not lower than 70° C. to preliminarily heat the insulator body. Thereafter, a given organic insulating material 3 is filled into the through hole 1a. As the organic insulating material, silicone rubber, urethane rubber, epoxy resin or the like is favorably used. Then, the filled organic insulating material 3 is cured by heating it at a temperature from 75° C. to 90° C. Thereby, the optical fiber composite insulator is obtained. When the organic insulating material is filled into the through hole 1a of the insulator body 1, the optical fiber passed through the through hole is stretched straight, and the optical fiber is kept straight stretched until the organic insulating material is cured.

The producing method according to the present invention may be also applied to two-stage piled optical fiber composite insulators as shown in FIG. 9 and multiple-stage piled optical fiber composite insulators.

EXPERIMENT 7

In order to examine influences of the preliminarily heating temperature of the entire insulator body and the curing temperature of the organic insulating material upon the insulators, optical fiber composite insulators were prepared by varying the above temperatures in various ways as shown in Table 5, and their influences were evaluated. At that time, the insulators each had a total length of 950 mm, a barrel diameter of 105 mm, a shed diameter of 205 mm, and an inner diameter of the through hole of 5 to 10 mm. As the optical fibers, quartz base optical fiber filaments were used. On the production of the optical fiber composite insulator, the optical fibers were passed through the through hole of the insulator body, and then the entire insulator body was preliminarily heated at a given temperature not lower than 70° C. for not less than 3 hours.

At a point of the time when the preliminary heating of the insulator was terminated, the temperature was kept at not less than 70° C., and a liquid silicone rubber was forcedly fed under pressure of 3 to 10 kgf/cm² into the through hole of the insulator body at a vacuum degree of not more than 5 torr. If the preliminarily heating temperature is different from the curing temperature of the silicone rubber, it is preferable to charge the silicone rubber a few to several hours after a heating kiln is heated up to a given curing temperature. When the preliminarily heating temperature is higher than 90° C., it takes a time for the insulator to reach the curing time of the rubber. Thus, the preheating temperature is preferably not more than 90° C. After the charging of the silicone rubber was finished, the insulator was kept at the curing temperature for not less than 3 hours to cure the silicone rubber by heating. Finally, light transmission losses of each of the optical fiber composite insulators at low and high temperatures (−20° C. and 80° C.) were obtained as the respectively average values of ten insulators. Results are shown in FIG. 23. The light transmission loss was obtained as a ratio of a light-transmitted amount at ordinary temperature (25° C.) and the light-transmitted amount at each temperature (−20° C. or 80° C.).

TABLE 5

| Sample No. | | Curing temperature of organic insulating material (°C.) | Preheating temperature (°C.) |
|---|---|---|---|
| Invention samples | 1 | 75 | 70 |
| | 2 | 80 | 75 |
| | 3 | 85 | 85 |
| | 4 | 90 | 85 |
| Comparative samples | 1 | 90 | 65 |
| | 2 | 70 | not preheated |
| | 3 | 110 | 85 |

It is seen from the results in FIG. 23 that the invention samples in which the preliminarily heating temperature was not less than 70° C. and the curing temperature of the organic insulating material was not less than 75° C. but not more than 90° C. exhibited lower light transmission losses at both the low temperature and high temperature as compared with comparative samples in which the above requirements were not satisfied in some respect.

As is clear from the above explanation, according to the present invention, since the entire insulator is preliminarily heated at not less than 70° C. and the organic insulating material is cured by heating at not less than 75° C. but not less than 90° C., the expanded amount and the shrunk amount of the organic insulating material at the time of curing can be reduced, so that the optical fibers having excellent light transmittability can be obtained.

In the fourth aspect of the present invention, optical fiber composite insulators as shown in FIGS. 8 and 9 can be produced by using a device as shown in FIG. 13. In the producing method of the invention, optical fibers 2 are passed through a through hole 1a of the insulator body, and each of upper and lower end portions of the insulator body 1 is fitted to a flange 6 at the outer peripheral surface through a cement layer 5. An organic insulating layer 3A is filled into the through hole 1a. The organic insulating material 3A is swelled up from an end face of each of upper and lower ends of the insulator body 1 to form a swelled portion 4. As the organic insulating material 3, silicone rubber, urethane rubber, epoxy rubber or the like may be recited by way of example.

In the embodiment of FIG. 8, a single insulator body 1 is used, whereas in the embodiment of FIG. 9, for example, two insulator bodies are integrated by piling these insulator bodies 1 and integrating them by connecting the flanges 6 with bolts 10.

By using the producing method of the invention, the swelled portions having various shapes as shown in FIGS. 7, 11 and 12 can be formed.

In the embodiment in FIG. 7, the swelled portion consists of three portions. That is, a frusto-conical portion 4a is formed concentrically with the through hole 1a, a columnar top portion 4c is formed on a central portion of the frusto-conical portion 4a, and a relatively thin extension portion 4b is formed at a skirt of the frusto-conical portion 4a. The optical fibers 2 are passed through the frusto-conical portion 4a and the columnar top portion 4c, and is taken out from a tip face of the columnar top portion 4c. In the swelled portion 4A shown in FIG. 11, the frusto-conical portion 4a is the same as that in FIG. 7, but the shape of the top portion is different from that of the top portion in FIG. 7. The shape of the top portion in FIG. 11 is not of a cylindrical column but a recess 4d is formed on a top face.

In the swelled portion 14 shown in FIG. 12, a flat discoidal portion 14a is formed on an end face 1c, and a columnar top portion 14b is formed in a central portion of the discoidal portion 14a. The optical fibers 2 are straight taken out from an end face of the columnar top portion 14b in the perpendicular direction.

The composite insulators shown in FIGS. 7, 11 and 12 can be produced at high efficiency according to the producing method of the present invention.

The organic insulating material 3B is filled into the through hole 1a in the state that the optical fiber passed through the through hole is stretched straight, and this state is kept until the organic insulating material 3B is cured. As a result, the optical fiber 2 is not finely bent due to the filling pressure of the organic insulating material or the shrinkage of the material 3B following the curing. Thus, the light transmission loss of the optical fiber is reduced, and even when the organic insulating material 3A expands or shrinks due to changes in the temperature, fatigue fracture of the optical fiber 2 is difficult to occur.

When the optical fiber passed through the through hole is to be stretched straight, it is preferable to set the elongation of the optical fiber at not less than 0.1% but not more than 1%. When the optical fiber is stretched at an elongation of less than 0.1%, the insulator is not so influenced by the charging pressure of the organic insulating material. However, the insulator is likely to be influenced by the shrinkage of the organic insulating material due to curing, and there is a tendency that microbending tends to occur in the optical fiber. Further, when the optical fiber is stretched at an elongation of more than 1%, the optical fiber is sealingly fixed with the organic material in the state that the optical fiber is kept stretched to an unnecessarily great extent. When the load applied to the optical fiber is removed after the organic insulating material is cured, the optical fiber is not uniformly shrunk in that a portion of the optical fiber fixed with the organic insulating material shrinks differently from that of a portion of the optical fiber not covered with the organic insulating material. Thus, the light transmission loss increases and the service life is likely to be shortened.

In the following, concrete experimental results will be described.

EXPERIMENT 8

Optical fiber composite insulators as shown in FIGS. 7 and 8 were prepared by using the device shown in FIG. 13. As an organic insulating material, liquid silicone rubber was used, and a heating-curing temperature and time were set at 70° C. to 90° C. and 3 to 8 hours, respectively. The dimensions of each insulator body was 950 mm in an entire length, 105 mm in a barrel diameter, and 205 mm in a shed diameter. As the optical fiber 2, two quartz base optical fiber filaments were used.

In Sample Nos. 1 through 5 in Table 8, while a tensile load was applied to each of the optical fibers 2 to give an elongation of 0.2% to 0.8%, silicone rubber was filled, and cured by heating. In Control Sample Nos. 6 through 9, while the optical fibers 2 were not particularly pulled and kept hanged in a natural state, the organic insulating material was filled, and cured. With respect each sample, the light transmission loss change amounts and the light-transmitted amount after a cooling/heating repetition test were evaluated. Results are shown in Table 6.

The light transmission loss change amounts were each obtained as a ratio of a minimum light-transmitted amount to a maximum light-transmitted amount in a temperature range of $-20°$ C. to 80° C. The light-transmitted amount after the cooling/heating repetition test was evaluated as follows. That is, each optical fiber composite insulator was subjected to cycles in which the insulator was immersed into a low temperature vessel at $-20°$ C. and a high temperature vessel at 80° C. per one cycle, by a number of times as given in Table 6, and then the light-transmitted amount at room temperature (25° C.) was measured. The evaluation results are shown by "⊙", "○" or "x". "⊙", "○" and "x" means the following.

"⊙" ... The light-transmitted amount measured at 25° C. was not less than 80% of the initial light-transmitted amount.

"○" ... The light-transmitted amount measured at 25° C. was less than 80% but not less than 50% of the initial light-transmitted amount.

"x" ... The light-transmitted amount measured at 25° C. was less than 50% of the initial light-transmitted amount.

TABLE 6

| | Sample No. | Change amount of loss of transmitted light ($-20$–80° C.) | Amount of transmitted light after repeated cooling-heating test | | | |
|---|---|---|---|---|---|---|
| | | | 200 cycle | 500 cycle | 1000 cycle | 1500 cycle |
| Examples | 1 | 0.93 | ⊙ | ⊙ | ⊙ | ⊙ |
| | 2 | 0.91 | ⊙ | ⊙ | ⊙ | ⊙ |
| | 3 | 0.96 | ⊙ | ⊙ | ⊙ | ⊙ |
| | 4 | 0.93 | ⊙ | ⊙ | ⊙ | ⊙ |
| | 5 | 0.94 | ⊙ | ⊙ | ⊙ | ⊙ |
| Comparative | 6 | 0.55 | ⊙ | ○ | ○ | X |
| Examples | 7 | 0.53 | ⊙ | ○ | ○ | ○ |
| | 8 | 0.50 | ⊙ | ⊙ | ○ | X |
| | 9 | 0.61 | ⊙ | ⊙ | ○ | X |

As is clear from the results in Table 6, according to the present invention, the light transmission loss change amounts can be reduced, the light-transmitted amounts after the cooling/heating repetition test can be increased, and the service life of the optical fiber composition insulator can be prolonged.

EXPERIMENT 9

Each optical fiber composite insulator was prepared in the same manner as in Experiment 8. A swelled portion 14 as shown in FIG. 12 was employed. As shown in FIG. 24, the elongation at which the optical fibers 2 are pulled was varied in various ways. In Sample B, upper and lower ends of the optical fiber 2 were each fixed to a point such that no tensile stress might be applied to the optical fiber. In Sample C, only an upper end of the optical fiber 2 was fixed to a point so that the optical fiber might be spontaneously hanged down by gravitational forces. With respect to each plot shown in FIG. 24, ten samples were prepared by trial.

As shown in FIG. 24, while the elongation was varied, the light transmission loss change amount of each sample was evaluated. The light transmission loss change amount was obtained as a ratio of a minimum light-transmitted amount to a maximum light-transmitted amount in a temperature range between $-20°$ C. and 80° C., and the average value of ten samples is shown.

As is clear from the results in FIG. 24, since the optical fiber is pulled according to the present invention, the light transmission loss change amount is reduced. Further, the elongation of the optical fiber is set preferably at an amount of 0.1 to 1.0%, more preferably at an amount of 0.2 to 0.8%.

According to the present invention, while the optical fiber is stretched straight, the organic insulating material is filled into the through hole of the insulator body, and the optical fiber is kept stretched straight until the organic insulating material is cured. As a result, the optical fiber becomes difficult to be finely bent owing to the filling pressure of the organic insulating material or the shrinkage of the organic insulating material following the curing. Thereby, the light transmission loss of the optical fiber can be reduced, and the fatigue fracture of the optical fiber is not likely to occur even when the organic insulating material expands or shrinks with changes in the temperature.

What is claimed is:

1. An optical fiber composite insulator comprising an insulator body in which a through hole having a substantially radially circular cross section is provided, a plurality of optical fibers passed through said through hole, and an organic insulating material gas-tightly sealing the optical fibers in the through hole, wherein a diameter of said through hole is not more than 13 mm, said optical fibers are located inside a hypothetical circle drawn on any plane orthogonal to an axis of the through hole and having a center coaxial with that of said through hole, said hypothetical circle having a diameter equal to 95% of that of the through hole, and a distance between any optical fibers is not less than 0.1 mm.

2. The optical fiber composite insulator claimed in claim 1, wherein said organic insulating material is swelled out from each end face of the insulator body to form a swelled portion, and a height from said end face to a tip of said swelled portion is set at not more than 40 mm.

3. The optical fiber composite insulator claimed in claim 2, wherein said swelled portion comprises a discoidal or frusto-conical portion, and a top portion provided on a central portion of said discoidal or frusto-conical portion, and a height of said top portion is not more than 5 mm.

4. The optical fiber composite insulator claimed in claim 3, wherein said top portion has a columnar shape, and a radius of a tip face of the top portion is not less than 3 mm.

5. The optical fiber composite insulator claimed in claim 2, wherein a bonded length from an outer peripheral edge of the through hole at the end face to an outer peripheral edge of a bonded portion of said swelled portion to the end face is not less than 1 mm and not more than 35 mm.

6. The optical fiber composite insulator claimed in claim 2, wherein a non-sealed portion of each of said optical fibers not sealed with the organic insulating material and projecting outwardly from said insulator body is inserted into a protective tube, said optical fiber being exposed between an end face of said protective tube and an end face of the organic insulating material, a holder with insertion holes is fixed to the end face of the organic insulating material, locations of said insertion holes being aligned with locations through which the optical fibers are taken out, and exposed portions of the optical fibers and a part of said protective tubes are held in said respective insertion holes.

7. The optical fiber composite insulator claimed in claim 6, wherein said holder is fixed to said organic insulating material with an adhesive.

8. The optical fiber composite insulator claimed in claim 6, wherein a cylindrical member is arranged around an outer periphery of said holder, said cylindrical member is bonded to the organic insulating material, and the holder is fixed to the organic insulating material by said cylindrical member bonded to the organic insulating material.

9. The optical fiber composite insulator claimed in claim 6, wherein said holder is comprised of a rubbery elastic material, and a diameter of said insertion hole is smaller than an outer diameter of said protective tube.

10. The optical fiber composite insulator claimed in claim 6, wherein a molding layer is provided around said protective tubes at a side of an end face of said holder.

* * * * *